US009720504B2

(12) United States Patent
Ton et al.

(10) Patent No.: US 9,720,504 B2
(45) Date of Patent: Aug. 1, 2017

(54) METHODS FOR SYSTEM ENGAGEMENT VIA 3D OBJECT DETECTION

(71) Applicant: QUALCOMM Incorporated, San Diego, CA (US)

(72) Inventors: Phuong Lam Ton, San Diego, CA (US); Hui-ya Liao Nelson, San Diego, CA (US); Ren Li, San Diego, CA (US); Shaun William Van Dyken, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 14/034,204

(22) Filed: Sep. 23, 2013

(65) Prior Publication Data

US 2014/0223385 A1    Aug. 7, 2014

Related U.S. Application Data

(60) Provisional application No. 61/761,186, filed on Feb. 5, 2013.

(51) Int. Cl.
*G06F 3/0488* (2013.01)
*G06F 3/01* (2006.01)

(52) U.S. Cl.
CPC ............ *G06F 3/017* (2013.01); *G06F 3/0488* (2013.01); *G06F 2203/04101* (2013.01); *G06F 2203/04806* (2013.01)

(58) Field of Classification Search
USPC ........................................................ 715/863
See application file for complete search history.

(56) References Cited

U.S. PATENT DOCUMENTS 8,451,246 B1 *   5/2013   Scholler .............. G06F 3/04883
                                                  345/173
8,615,108 B1 * 12/2013   Stoppa ............... G06K 9/00355
                                                  382/103

(Continued)

FOREIGN PATENT DOCUMENTS

WO    WO-2006003590 A2    1/2006
WO    WO-2009028892 A2    3/2009

OTHER PUBLICATIONS

International Search Report and Written Opinion—PCT/US2013/077511—ISA/EPO—Mar. 5, 2014.

*Primary Examiner* — Reza Nabi
(74) *Attorney, Agent, or Firm* — Kilpatrick Townsend & Stockton, LLP

(57) ABSTRACT

Methods and apparatuses are presented for controlling an application on a device. In some embodiments, a method may include detecting that a user is maintaining an object or gesture at a position hovering near the device for a threshold length of time. The method may also include anchoring an initial position of the object or gesture to the device based on the detection of the maintained position, and controlling the application using the anchored initial position. In some embodiments, controlling the application using the anchored initial position may include manipulating the application based on detecting within a stable zone associated with the anchored initial position a change in height of the gesture or object relative to the device, and not manipulating the application whenever the object or gesture is detected to move along a plane above and parallel to the device and within the stable zone.

34 Claims, 18 Drawing Sheets

(56) References Cited

U.S. PATENT DOCUMENTS

| | | | | |
|---|---|---|---|---|
| 8,854,433 B1* | 10/2014 | Rafii | G06F 3/017 | 348/42 |
| 2008/0165140 A1* | 7/2008 | Christie | G06F 3/04883 | 345/173 |
| 2008/0278450 A1* | 11/2008 | Lashina | | 345/173 |
| 2009/0265670 A1* | 10/2009 | Kim | G06F 3/04883 | 715/863 |
| 2010/0090964 A1* | 4/2010 | Soo et al. | | 345/173 |
| 2010/0289825 A1* | 11/2010 | Shin | G06F 3/04845 | 345/667 |
| 2010/0295781 A1* | 11/2010 | Alameh | G06F 3/0346 | 345/158 |
| 2011/0213655 A1* | 9/2011 | Henkin | G06Q 30/00 | 705/14.49 |
| 2011/0279397 A1* | 11/2011 | Rimon | G06F 3/044 | 345/173 |
| 2012/0120029 A1* | 5/2012 | McCarthy | G06F 3/0421 | 345/175 |
| 2012/0179970 A1* | 7/2012 | Hayes | G06F 3/04883 | 715/722 |
| 2012/0254808 A1* | 10/2012 | Gildfind | G06F 3/04812 | 715/863 |
| 2012/0268369 A1* | 10/2012 | Kikkeri | G06F 3/038 | 345/157 |
| 2012/0299862 A1* | 11/2012 | Matsumoto | G06F 3/0488 | 345/173 |
| 2012/0313848 A1* | 12/2012 | Galor | G06F 3/005 | 345/156 |
| 2013/0034265 A1* | 2/2013 | Nakasu | G06K 9/00208 | 382/103 |
| 2013/0204457 A1* | 8/2013 | King | B60K 28/06 | 701/1 |
| 2014/0071130 A1* | 3/2014 | Piemonte | G01C 21/3638 | 345/427 |
| 2014/0191972 A1* | 7/2014 | Case | G06F 3/017 | 345/168 |
| 2014/0198059 A1* | 7/2014 | Gu | G06F 3/041 | 345/173 |
| 2014/0211991 A1* | 7/2014 | Stoppa | G06K 9/00355 | 382/103 |
| 2014/0298273 A1* | 10/2014 | Blackstone | G06F 3/017 | 715/863 |
| 2015/0153443 A1* | 6/2015 | Van Taunay | G01S 5/14 | 702/150 |
| 2015/0177957 A1* | 6/2015 | Bae | G06F 3/04842 | 715/835 |
| 2016/0170491 A1* | 6/2016 | Jung | G06F 3/0488 | 715/856 |
| 2017/0038941 A1* | 2/2017 | Pylappan | G06F 3/04815 | |
| 2017/0139482 A1* | 5/2017 | Ahn | G06F 3/017 | |

* cited by examiner

METHODS FOR SYSTEM ENGAGEMENT VIA 3D OBJECT DETECTION

CROSS REFERENCE TO RELATED APPLICATIONS

This application claims the benefit of U.S. Provisional Application 61/761,186, filed Feb. 5, 2013, and titled "SYSTEM ENGAGEMENT VIA 3D OBJECT DETECTION," the disclosures of which are hereby incorporated by reference in their entirety and for all purposes.

BACKGROUND

The present disclosure generally relates to user devices or systems, and more particularly, to system engagement.

Currently, a user device may generally be engaged by manually turning on the device, for example, by using a touch screen, pressing a button, or by other suitable manual ways for touching the device. In an example where the user device is a smart phone, a user may unlock the device by pressing the power button, sliding an unlock key, touching the screen, or a combination thereof. However, such current ways for engaging a device may be cumbersome and not user friendly.

Thus, there is a need in the art for improved methods and systems for engaging a system or device.

SUMMARY

According to one or more embodiments of the present disclosure, methods and systems provide engaging and controlling a system via 3D object detection. Once the system is engaged, the system may switch to a particular mode, function, control or interface.

In some embodiments, a method is presented for controlling an application on a device. The method may include detecting that a user is maintaining an object or gesture at a position hovering near the device for a threshold length of time. The method may also include anchoring an initial position of the object or gesture to the device based on the detection of the maintained position, and controlling the application using the anchored initial position.

In some embodiments, controlling the application using the anchored initial position includes manipulating the application based on detecting within a stable zone associated with the anchored initial position a change in height of the gesture or object relative to the device, and not manipulating the application whenever the object or gesture is detected to move along a plane above and parallel to the device and within the stable zone.

In some embodiments, controlling the application using the anchored initial position further includes manipulating the application whenever the object or gesture is detected to hover over a region outside of the stable zone. Manipulating the application may include performing a first panning action having a first speed if the object or gesture is detected to hover over a first region outside of the stable zone, and performing a second panning action having a second speed if the object or gesture is detected to hover over a second region outside of the stable zone, wherein the second region is farther away from the stable zone than the first region.

In some embodiments, controlling the application using the anchored initial position includes detecting at least one movement of the object or gesture in 3-dimensional space hovering above the device.

In some embodiments manipulating the application is based on the position of the object or gesture hovering over the device relative to the initial position.

In some embodiments, manipulating the application further comprises performing a third action if the object or gesture is detected to hover over a third region outside of the stable zone, wherein the third region is farther away from the stable zone than the second region.

In some embodiments, the method further includes detecting that the user is hovering the gesture or object at a position above the device.

In some embodiments, the method further includes detecting that the user is hovering the gesture or object at a position below the device.

In some embodiments, controlling the application includes using a user interface anchored to the application based on the anchored initial position.

In some embodiments, the user interface anchored to the application may be centered onto the application according to the initial position of the detected gesture or object hovering near the device.

In some embodiments, an apparatus is presented. The apparatus may include at least one sensor configured to detect that a user is maintaining an object or gesture at a position hovering near said apparatus for a threshold length of time. The apparatus may also include a processor configured to: anchor an initial position of the object or gesture to said apparatus based on the detection of the maintained position, and control an application configured to operate on said apparatus using the anchored initial position.

In some embodiments, an apparatus is presented including means for detecting that a user is maintaining an object or gesture at a position hovering near said apparatus for a threshold length of time, means for anchoring an initial position of the object or gesture to said apparatus based on the detection of the maintained position, and means for controlling an application operating on said apparatus using the anchored initial position.

In some embodiments, a non-transitory processor-readable medium is presented, which may include processor-readable instructions configured to cause a processor to: detect that a user is maintaining an object or gesture at a position hovering near a device for a threshold length of time, anchor an initial position of the object or gesture to the device based on the detection of the maintained position, and control an application configured to operate on the device using the anchored initial position.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
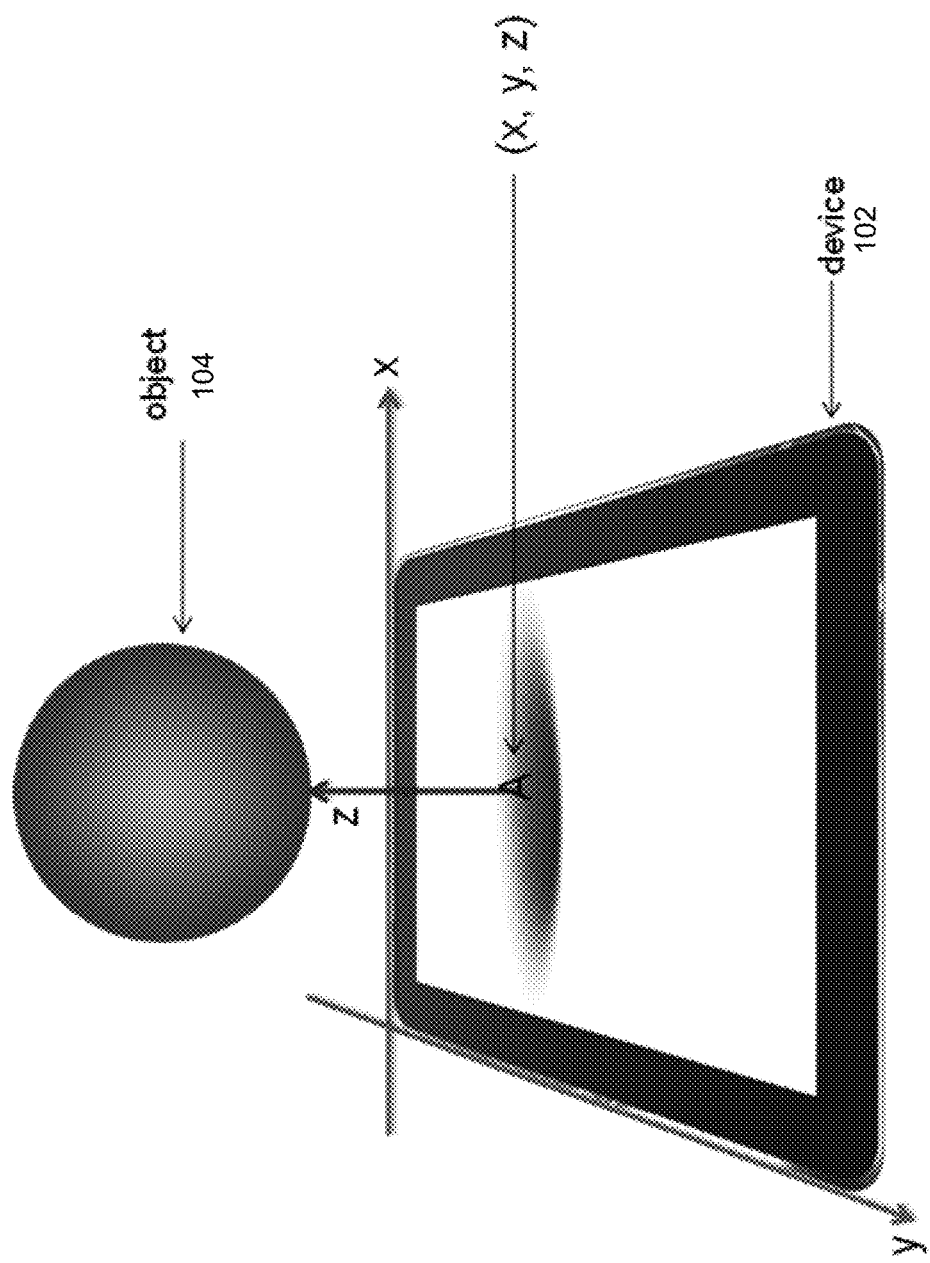
FIG. 1 is a diagram illustrating a point in a three dimensional (3D) coordinate system relative to a device according to some embodiments.

Methods and apparatuses are presented for engaging and operating a graphical application using a single object or gesture in a 3-dimensional, touchless environment dynamically generated above or near the application. While a number of devices for operating applications using touchless techniques are available commercially, there remain a number of limitations that can be improved upon. For example, a video game platform operated by touchless techniques may require the user to be centered squarely within purview of a camera. As another example, the touchless environment may be capable of detecting movements essentially only in 2 dimensions (e.g. horizontally and vertically, while lacking depth). Similarly, multiple gestures and/or multiple moving objects (e.g. two hands, pinching motion, etc.) may be required in order to perform more than two types of actions in the 2-D environment (e.g. perform zooming out, beyond just moving a cursor horizontally and vertically). In other cases, detection methods may be too sensitive, in that small jitter by the user, e.g. operating a mobile device while in a moving vehicle, causes unwanted movement or manipulation of the application. On the other hand, the resolution of touchless detection methods may be too insensitive, in that small movements by the user may not correspond to any movement of the application.

Improved methods and systems for engaging a system or a device via 3D object detection are presented and may be capable of solving any and all of these problems all at once. Once a system is engaged, the system may switch to a particular mode, function control or interface.

In some embodiments, touch-less implementations are provided by using suitable touch-less technologies, for example, ultrasound technology (e.g., using microphones and/or ultrasound emitters), image or video capturing technologies such as cameras, IR or UV technology, magnetic field technology, or emitted electromagnetic radiation technology, etc. In an example of a touch-less implementation, for a device that includes an internal camera-based gesture system, a user's open palm may be detected and used to engage the system. In another example, the user may wave his or her hand in front of the camera-based gesture system in order to engage the system.

In various embodiments, to engage the system, an object or gesture near the system or device is detected. For example, the system may detect an object that hovers within coordinates above the system, or in other examples, the system may detect an object that hovers outside coordinates above the system, that is, out of the line of sight of the system such as to the right, left, top, or bottom of the system (e.g., off-screen with respect to a user device). The physical location of the object is inputted to the system and may be described in three-dimensional (3D) space by way of three coordinates (x, y, z). The system may be engaged in response to determining that the object has hovered near the device for a predetermined amount of time (e.g., 500 milliseconds, or other appropriate amount of time). The predetermined amount of time value may or may not be configurable, or may vary based on a current state or context of the system.

The hover location may be bounded by an offset. For example, an initial detected coordinate may not be restricted to one point, but it may be restricted to a bounding area or location, e.g., a bounding circle, with a defined and/or configurable dimension, e.g., a defined and/or configurable radius for a bounding circle. If the object hovers within the bounded area or location for at least a predetermined amount of time, then the system becomes engaged.

Once the system is engaged, the system may switch to a particular mode, function, control, or interface. In various embodiments, the user may control the system by moving in three-dimensional coordinates (e.g., x, y, z directions). Velocity may also be taken into account. Because of the three-dimensional coordinates, a control such as a joystick may be implemented. For example, detected movement of the object may be used to emulate how a joystick would control the mode, function, control, or interface.

As such, the engaged system may be controlled in three dimensions, for example, like a joystick were being used. In one embodiment, an initial detected point and bounding location circle may serve as a center or a "stick" for a joystick. For example, the joystick may include a center control or "stick" such that a detected z-value while in the bounded location may be treated as if the joystick is being pulled up (z value is increasing) or being pushed down (z value is decreasing). It should be noted that currently, most joysticks do not have a center control on the joystick, but rather, they only have pivoting angles.

In various embodiments, with respect to a center or "stick" of a joystick, gestures may also be detected. For example, the center or "stick" of the joystick may be held and rotated clockwise or counter clockwise, for example when the object is being rotated or moved around within the bounded location. Data input may be used to detect these gestures. This allows for the center or "stick" of the joystick to be rotated. This feature may be used in various use cases or applications, for example, detection of the rotation of a joystick may be suitable for use in game applications. Therefore, in addition to the center or "stick" being able to be pulled up to a certain maximum or pushed down to a certain minimum threshold, velocity as well as gestures may be detected.

If a detected object moves outside of the initial bounding area or location (e.g., outside the bounding circle), then the joystick control may act the same as if the joystick is pivoted in that angle, direction, and velocity.

In some embodiments, with respect to pivoting of a joystick, when the hovering of an object is moved to some particular angle the mode, function, control, or interface may be adjusted as if a joystick were being used to adjust that mode, function, control, or interface. Velocity of the object movement may also be calculated. For example, in a use case where a user moves the object (e.g. finger, pointer, etc.) quickly to the right on a display showing content such as a map, then control speed, e.g., panning speed for a map, may be scaled to the velocity.

In various embodiments, a particular angle or direction of movement of the object, or sector of the bounded location or area beyond the bounded into which the object moved, may initiate an action such as changing modes, performing a function or control, or changing an interface. In an embodiment for a bounding circle, a sector may be a region bounded by two radii and an arc lying between the radii. Any combination of x, y, z dimensions, velocity and gesture may be detected in the center and/or outer regions for control. In some embodiments, the sector may be defined to comprise another shape. Further, when the bounded location comprises a bounding circle, concentric rings around the bounding circle may correspond to different functions.

When the object is no longer detected or is out of range of the system, the system may be disengaged. The disengagement detection may be perceived as immediate to the user. In some embodiments, the system maybe disengaged when a predetermined disengagement motion, action, or gesture (for example, when the object moves in an "X" shape) is detected.

By using the three-dimensional coordinates (e.g., x, y, z) and velocity, data may be translated to a virtual force in application development.

Referring to FIG. 1, a diagram illustrates a point in a three dimensional (3D) coordinate system relative to a device according to an embodiment of the present disclosure.

A device 102, which may include a tablet, a smart phone, a latptop, a PC, or the like, may detect an object 104 hovering over device 102 using a touch-less technology such as ultrasound technology. In various embodiments, device 102 may detect object 104 as it hovers above device 102, i.e., within coordinates above the system, or in other embodiments, device 102 may detect object 104 as it hovers out of the line of sight of device 102, for example, off-screen with respect to device 102.

Device 102, which may display any data or content, may also show an image corresponding to detected object 104 on which a point or location "A" may be identified. Point "A" in the image may be located by its three dimensional (3D) coordinates (x, y, z) relative to device 102. Thus, point "A" in the image of object 104 on device 102 may be a 3D coordinate point (x, y, z).

In various embodiments, physical 3D coordinates may be converted to screen coordinates. The conversion may take into account display pixel density for a particular device. Therefore, regardless of the device, the physical 3D coordinates relative to the device may be converted to the particular device's screen coordinates. For example, when an object is detected off-screen such as to the left of the device, the converted coordinates may have a negative x value.

Figure 2:
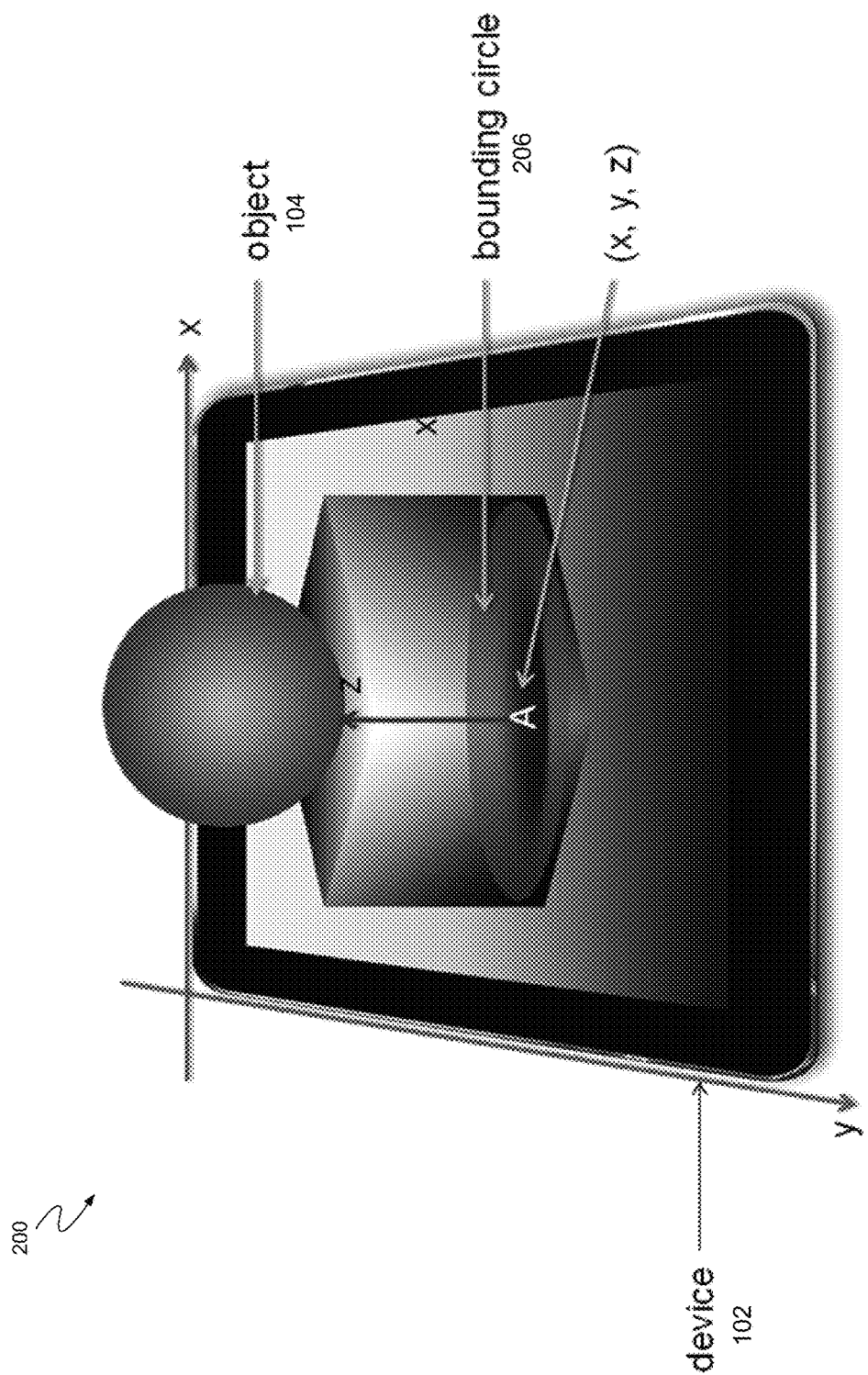
FIG. 2 is a diagram illustrating a bounding region of a point in a 3D coordinate system relative to a device according to some embodiments.

Referring to FIG. 2, diagram 200 illustrates a bounding region of a point in a 3D coordinate system relative to a device according to an embodiment of the present disclosure.

As described above with respect to the embodiment of FIG. 1, a point "A" in an image of a hovering object 104 displayed on a device 102 may be located by its three dimensional (3D) coordinates (x, y, z) relative to device 102. A bounding region such as a bounding circle 206 may include point "A" plus a predefined radius. In this embodiment, point "A" is the center of bounding circle 206. It should be appreciated that the bounding region may be of any shape other than a circle, including for example, a bounding ellipse, a bounding rectangle, or any other suitable shape. Further, while the bounding region is illustrated as a flat circle in FIG. 2, it will be appreciated that the bounding region may be a 3-dimensional shape, such as a sphere or cube. Thus, detecting that the object is located within the bounding region may comprise detecting that the object is within a certain set of (x,y) coordinates, regardless of the object's distance from the device 102, or the detecting may comprise detecting that the object is within certain depth parameters as well. In addition, the bounding region may be adjusted by the user, or may automatically vary based on the state or context of the device 102.

Figure 3:
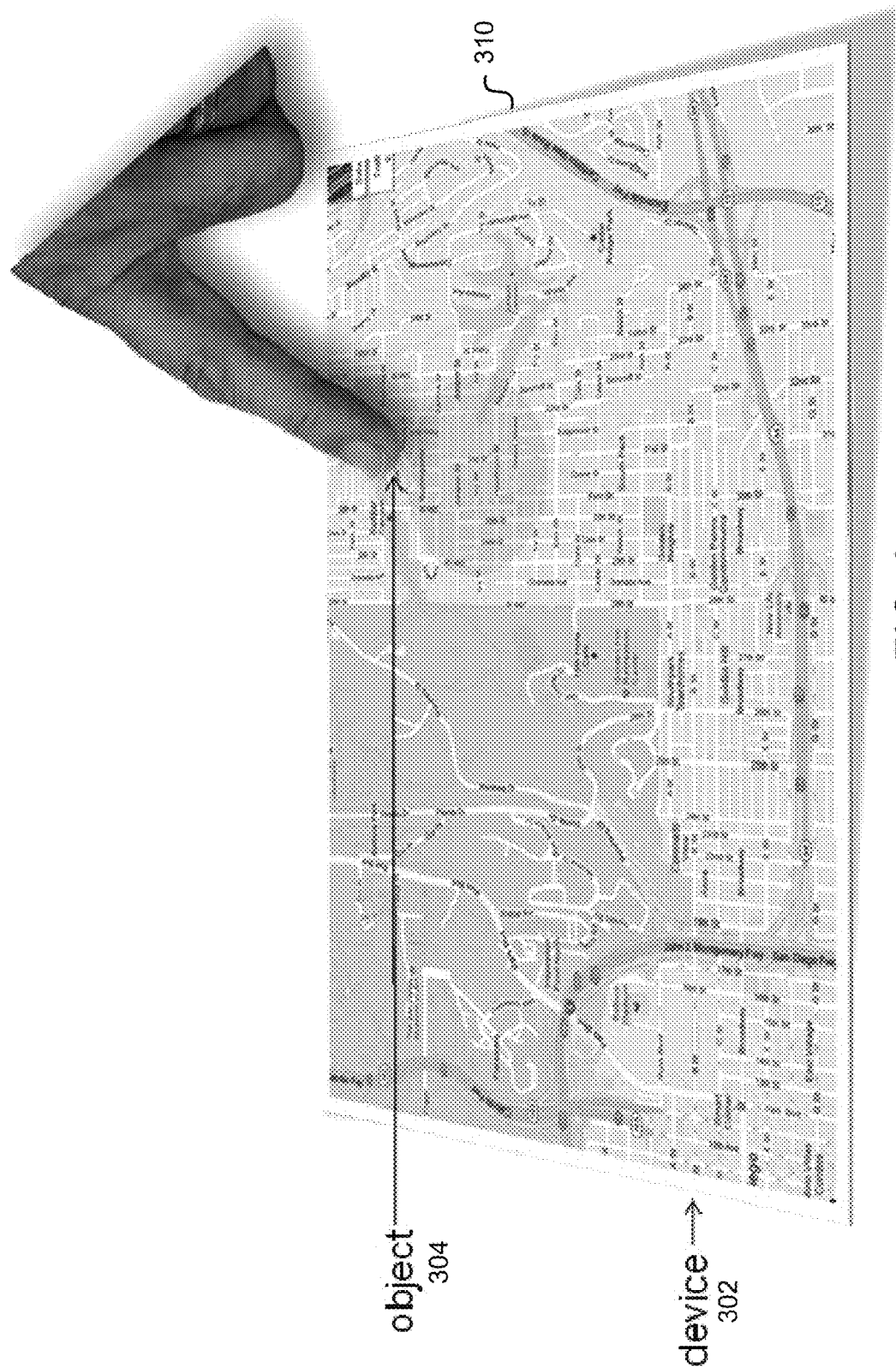
FIGS. 3-5 illustrate a use case for engaging a system via 3D object detection according to some embodiments.
Figure 4:
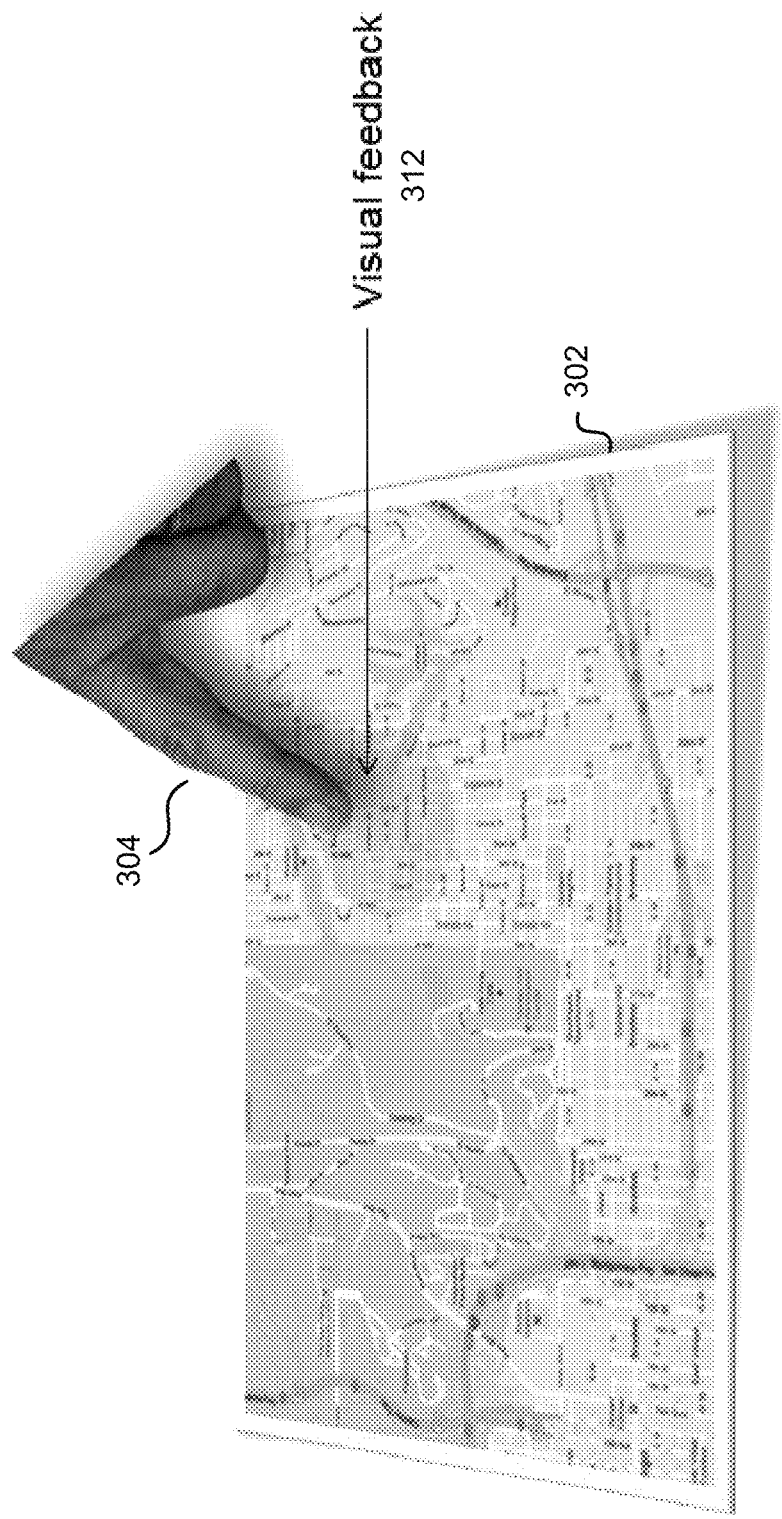
Figure 5:
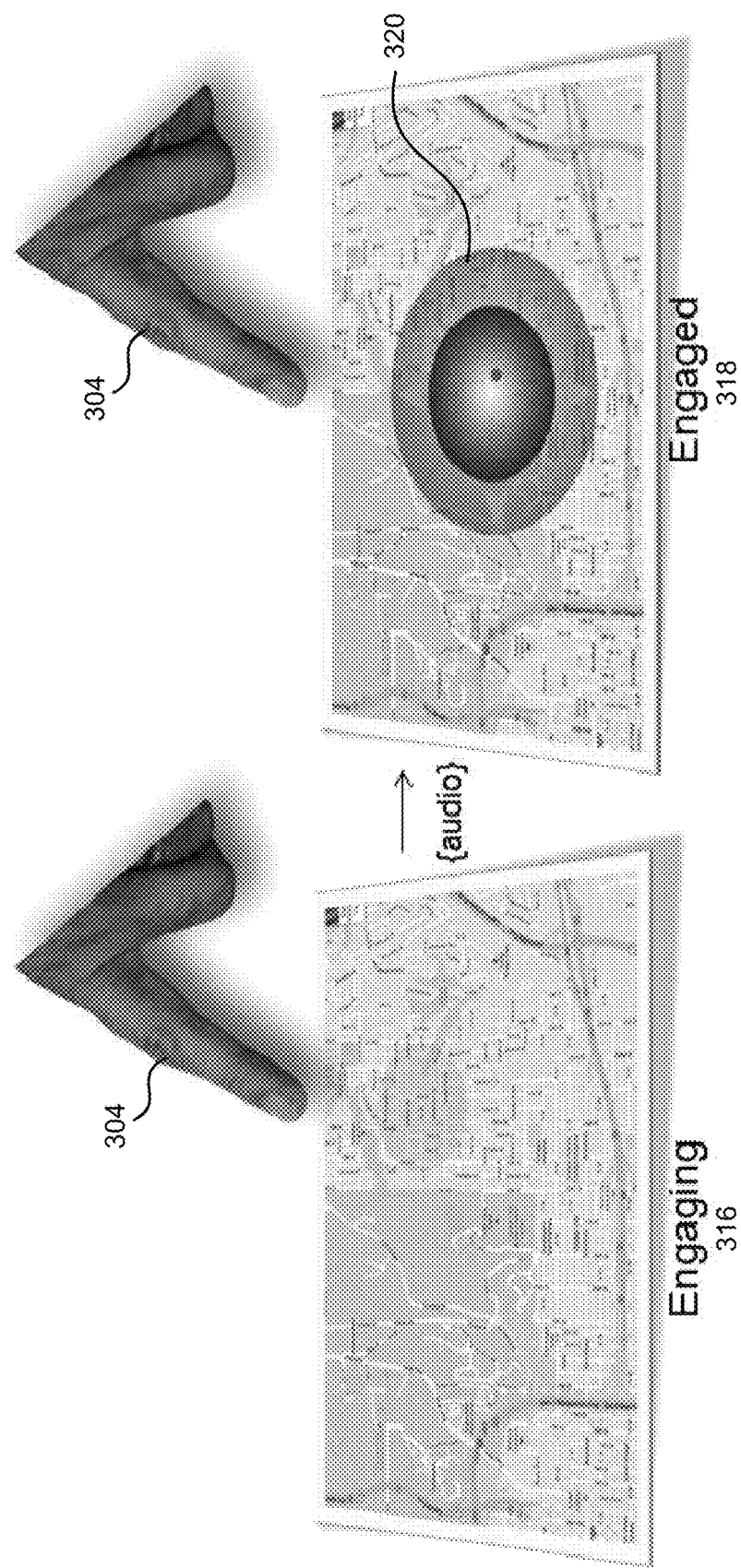

Referring to FIGS. 3-5, an example use case for engaging a system via 3D object detection is illustrated according to some embodiments.

In FIG. 3, content or an image such as a map 310 may be displayed on an interface of a user device 302. Device 302 may be configured to detect any object or gesture, for example, a finger 304 using any suitable touch-less technology such as ultrasound technology.

In FIG. 4, engaging a device 302 (or a system that is part of device 302), may include detecting a finger 304 such that the three dimensional (3D) object location relative to device 302 is inputted to the system. At this "Engaging state," the system begins to engage.

Visual feedback such as by a visual indicator 312 may be displayed on the user device below the object, i.e., below finger 304, to represent or give a relative idea of a bounding location.

In FIG. 5, the system may determine if the object (i.e., finger 304) hovers within a bounding location, e.g., a bounding circle for at least a predetermined amount of time, for example 500 milliseconds. If so, the system transitions from an "Engaging state" 316 to an "Engaged state" 318. Visual and/or audio feedback may be provided to the user while a hover in the bounding region is being detected, for example to indicate to a user a progress toward reaching the engaged state.

In "Engaged state" 318, a user interface control such as a joystick control 320 may be displayed on the user device. Thus, the control 320 may provide feedback to the user that the device 102 has been engaged. In one or more embodiments, audio feedback may be provided to indicate a state change.

Referring to FIGS. 6-11, an example use case for controlling an engaged system via 3D object detection is illustrated according to some embodiments.

Figure 6:
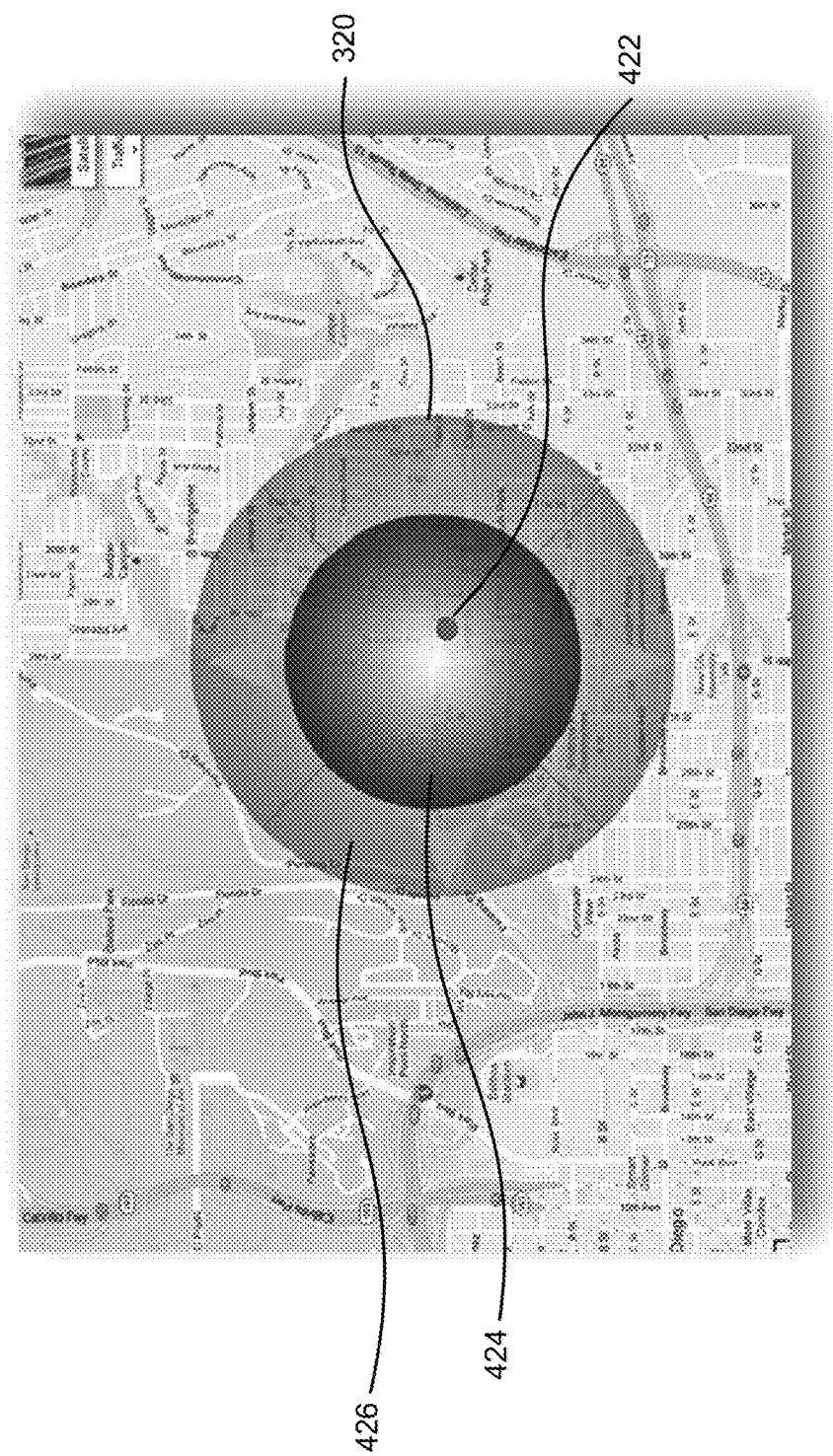
FIGS. 6-14 illustrate a use case for controlling an engaged system via 3D object detection according to some embodiments.

In FIG. 6, once a system is in an "Engaged state," a user may use a user interface control such as a joystick 320 to perform different functions such as zooming, panning, etc.

On the user interface control, an actual detected coordinate (for example a 3D coordinate for point "A" as described above with respect to FIG. 1 according to an embodiment) may be indicated by a dot 422.

A center of the user interface control, which may be represented by a section or circle 424, may be used as the center of joystick 320. Outer regions 426 surrounding the center section or circle 424 may be treated as pivot points of joystick 320.

Figure 7:
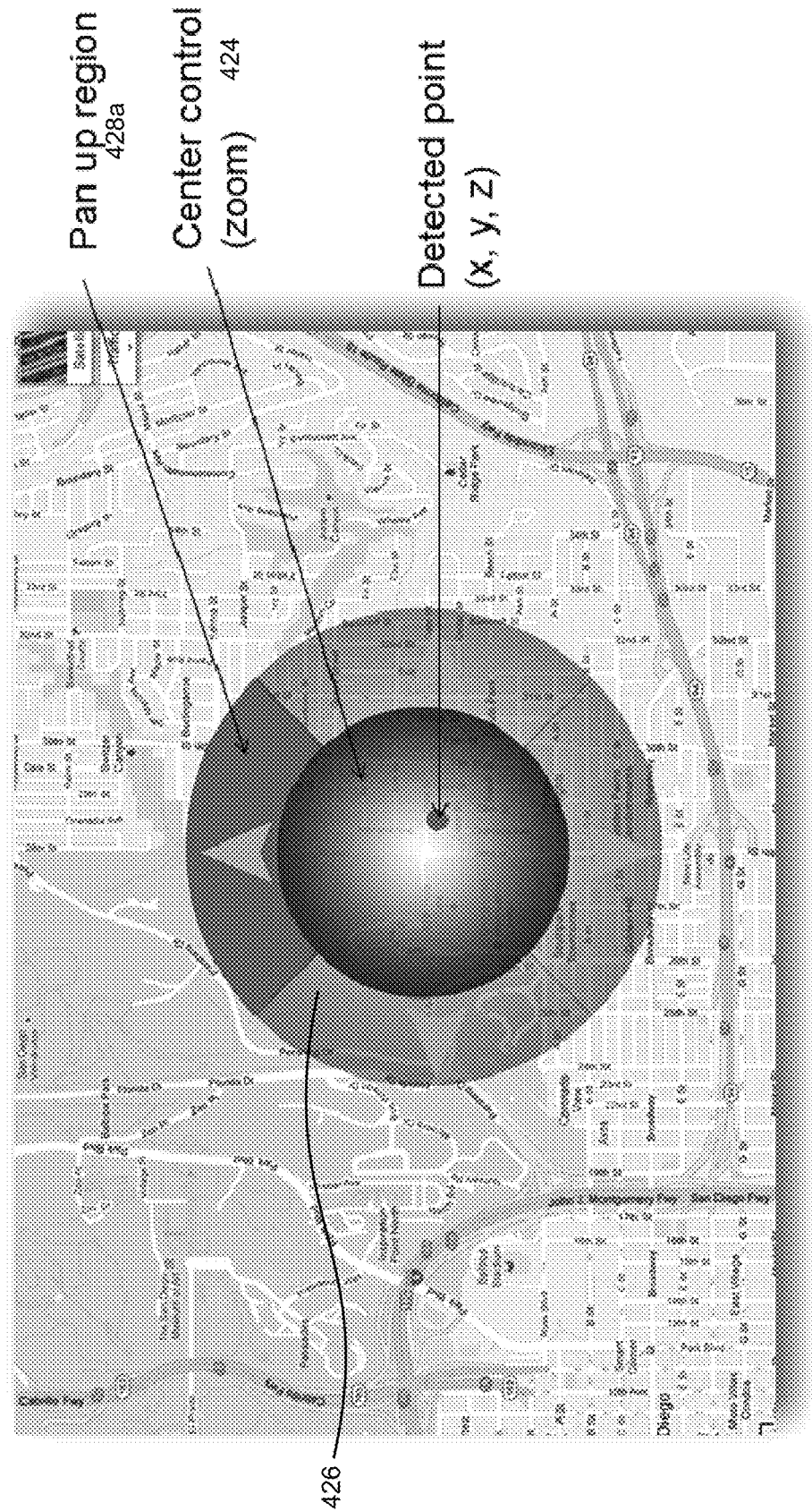

In FIG. 7, a center control section 424 may be associated with a zoom control. Outer regions or sections 426 may be divided into sectors, including for example a sector 428a. The sectors may be panning controls. For example, sector 428a may be a "Panning Up" control region.

Figure 8:
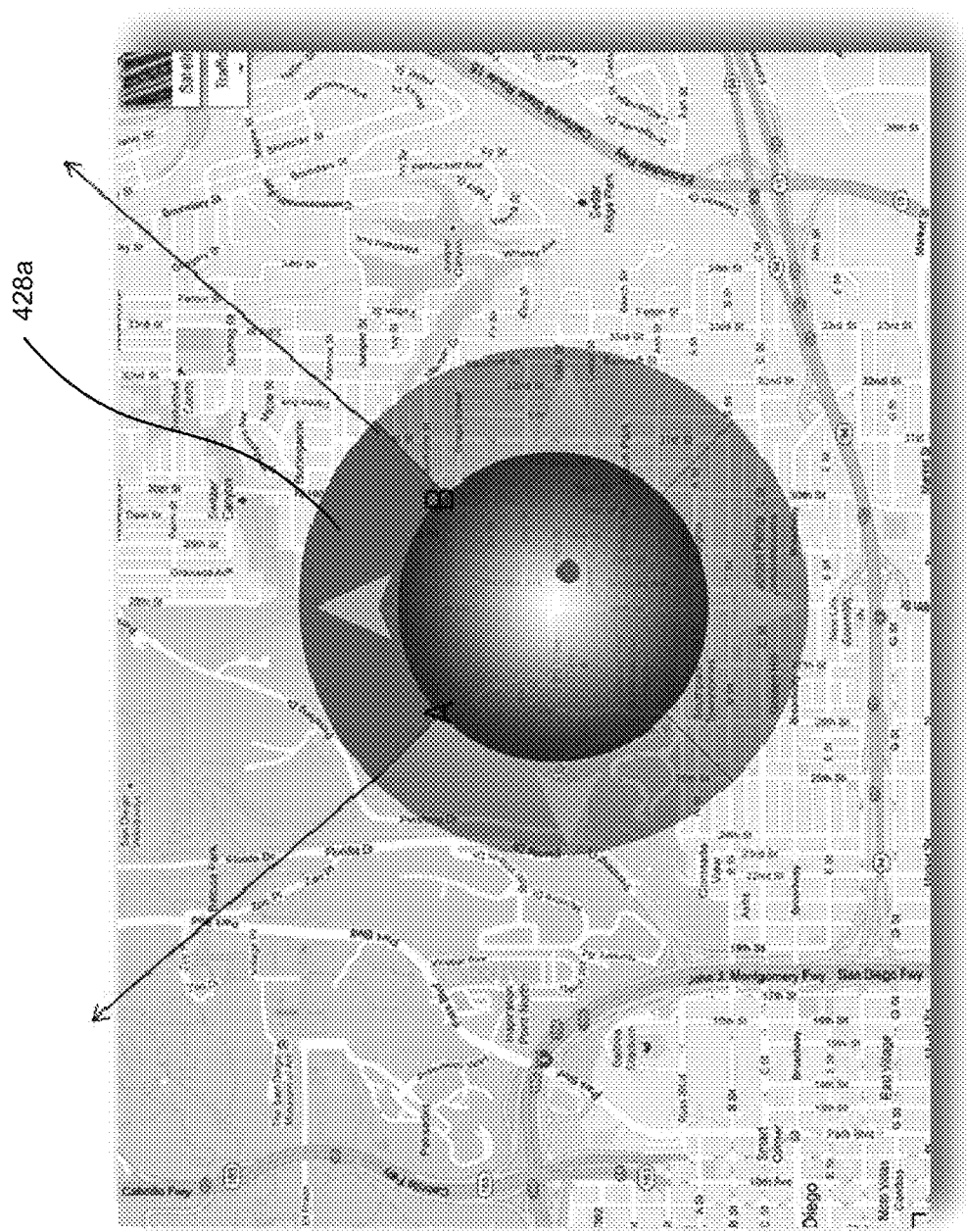

In FIG. 8, according to one or more embodiments, an outer region may be extended past the displayed control. In some embodiments, the outer region may be bound only by sector angles. For example, for a sector 428a, the outer region may be bound by a sector angle between locations A and B. In this way, a "Panning Up" region corresponding to sector 428a may be extended past sector 428a into an outer region bound by the corresponding sector angle for sector 428a. In other embodiments, moving the object or dot past the portion of sector 428a highlighted in red may result in no action, or may result in a different action, for example a different magnitude of panning or skipping to a next favorite map.

Figure 9:
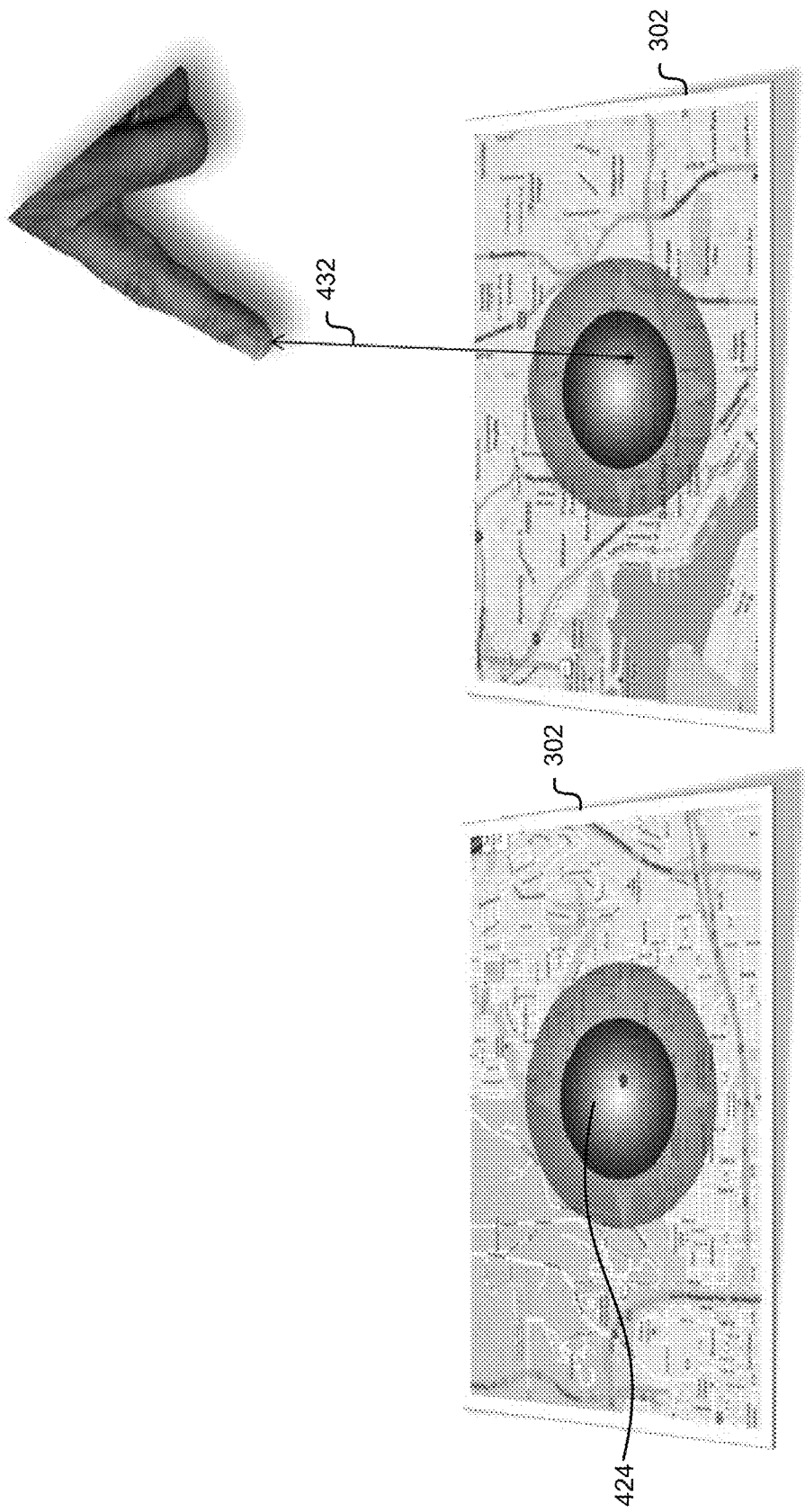

In FIG. 9, according to some embodiments, if an object (e.g., a finger) is hovering within a center region 424 displayed on a device 302, the system may be in a zoom mode. In this case, the system may use the z-coordinate to determine a distance from the object to the device 302. Moving the object away from the device 302, as illustrated by reference numeral 432, may correspond to "zooming out." In FIG. 10, moving the object towards the device 302, as illustrated at reference numeral 434, may correspond to "zooming in." In some embodiments, zooming may be performed even when the object is detected as being outside of the center region 424, for example such that panning and zooming may be performed at the same time.

In various embodiments, a zoom mode may take into account 3D coordinates (x, y, z) and velocity. There may be a minimum and a maximum detectable z point. For example, if a user passes a maximum threshold and is still within a detectable distance, zooming out (for example zooming out a map) may continue at a predetermined set step and/or interval. By way of a comparative example, a user may pull a physical joystick device to its maximum limit. Although the stick may not move any longer, there is a force pulling and keeping the stick up. Conversely, a similar mechanism may apply when pushing the stick to its minimum limit. In this regard, if the user passes the minimum threshold, zooming in (for example zooming in a map) may continue at a predetermined set step and/or interval. In various embodiments, the minimum and maximum thresholds may be configurable and/or based on device calibration.

In some embodiments, no zoom may occur where the object moves within circle 424 in directions parallel to the device 302. Because the object is not moving closer or farther away from device 302, no zooming function may be performed. In other cases, even if the object moves only slightly closer or farther away from device 302, e.g., within some predetermined threshold distance, no zoom may occur as well. In this way, an object may be detected as moving with slight perturbations, dither, or fluctuations, and methods according to some embodiments may intentionally not perform any action as a result. Such functionality may allow for small, unintended movements, e.g., the object moving slightly in a bouncy automobile, to not cause any disruption by unintentionally manipulating the application operating on device 302. This 3-dimensional space within circle 424, in which detected changes of the object result in no manipulations of the application, may be referred to as a "stable zone" or "dead zone" herein.

Figure 10:
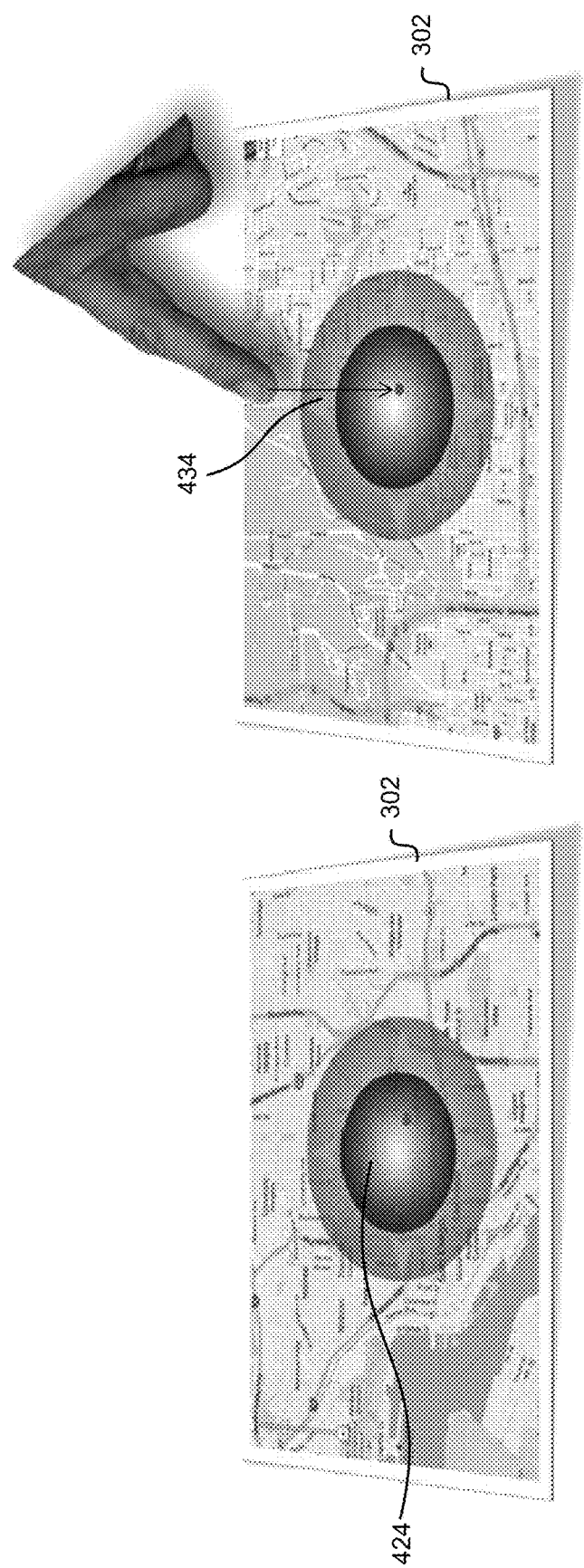
Figure 11:
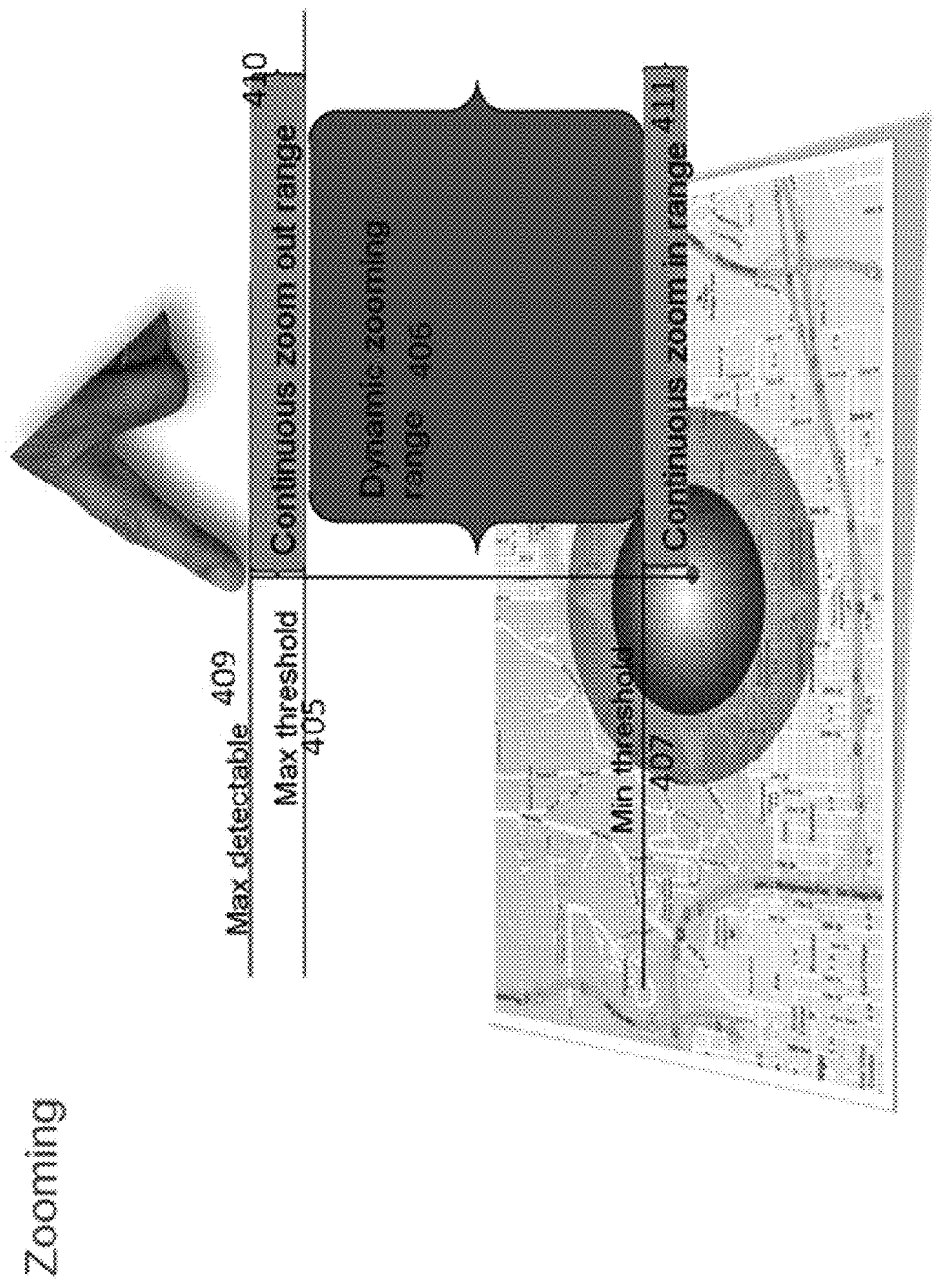

Referring now to FIG. 11, zooming thresholds are illustrated according to some embodiments. Here, an object such as a finger may be detected as effecting a zoom in or out as illustrated in the embodiments of FIGS. 9 and 10. In FIG. 11, the object (e.g., the finger) may be detected as having been moved out of range beyond a dynamic zooming range 406 and past a maximum threshold 405. If the object is within a continuous zoom-out range 410 up to a maximum detectable distance 409 (i.e., up to a maximum detectable z point), then the action, i.e., zooming out, may continue at a predetermined set step and/or interval.

Conversely, the object (e.g., finger) may be detected as having been moved below dynamic zooming range 406 and past a minimum threshold 407. If the object is within a continuous zoom-in range 411, then the action, i.e., zooming in, may continue at a predetermined set step and/or interval.

Figure 12:
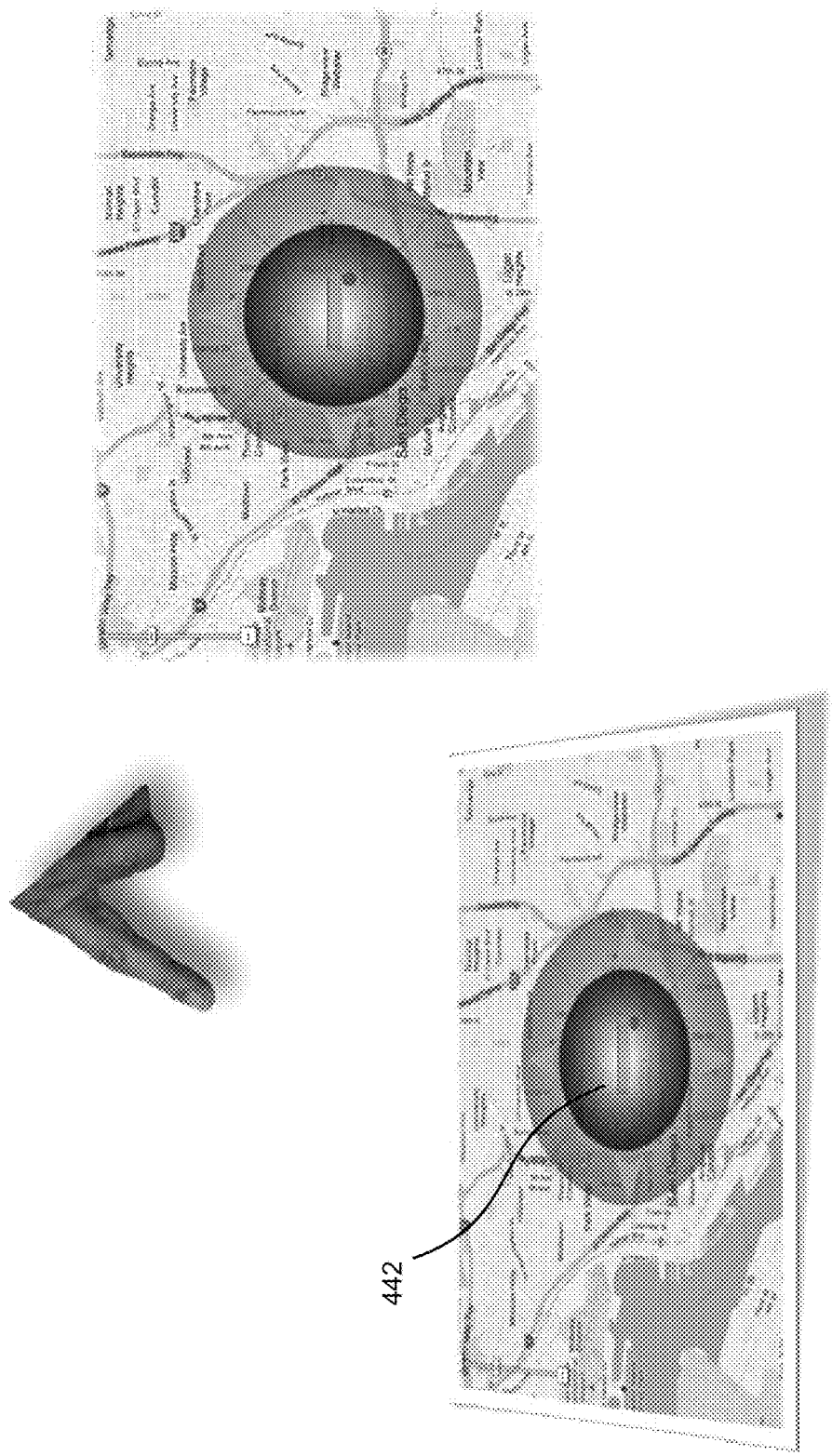

In FIG. 12, according to some embodiments, if an application or action has reached a maximum or minimum threshold, then an audio feedback or a visual feedback, for example as illustrated at reference numeral 442, may be provided to indicate a change in state or function. For example, an image on device 302 may display that a maximum threshold for zooming out has been reached and auto zoom out has been initiated. In this case, visual cue 442 indicates that the object (e.g. a finger) has been raised to the maximum level above the device 302 at which the application may change responses (e.g. change zoom out).

Figure 13:
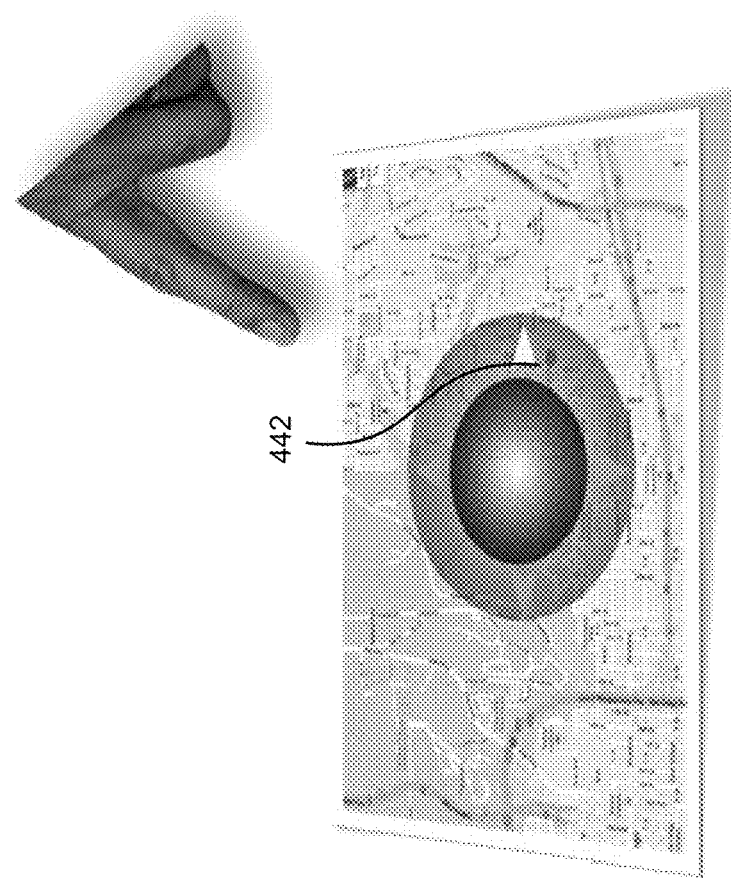
Figure 13:
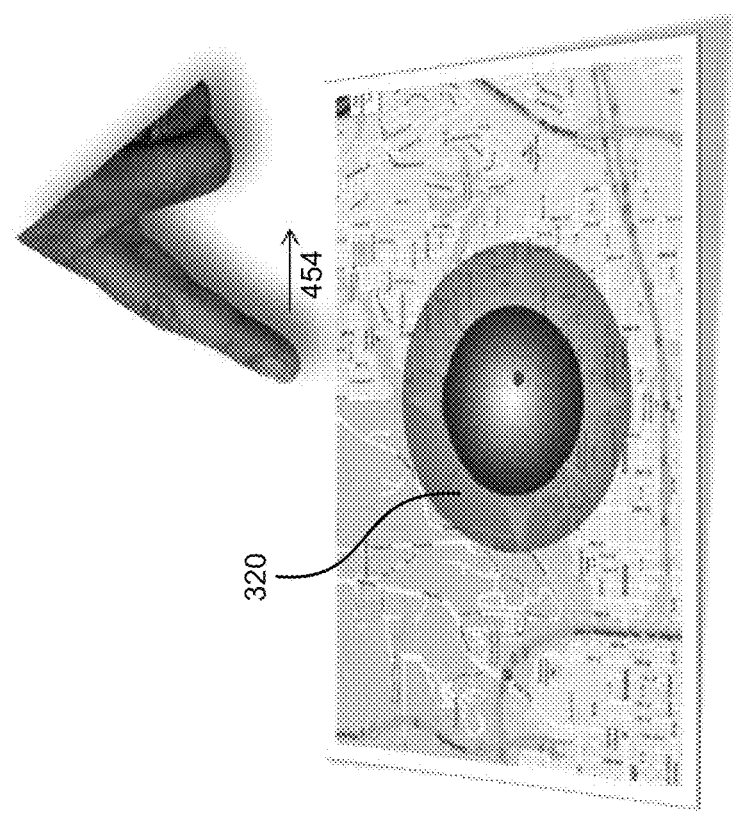

Referring to FIG. 13, an action such as panning may be effected according to some embodiments. In this regard, if an object (e.g., a finger) hovers outside of a zoom region, for example, on the outer regions outside the center circle of a control such as a joystick 320, the joystick 320 may pivot. An angular pivot may be determined by a detected coordinate, for example, a coordinate as represented by a dot 452. In FIG. 13, a user may pivot the object (i.e., the user's finger) to the right as represented by arrow 454. As a result, the content displayed on the user device, for example a map application, pans to the right at a predetermined step and/or interval.

Figure 14:
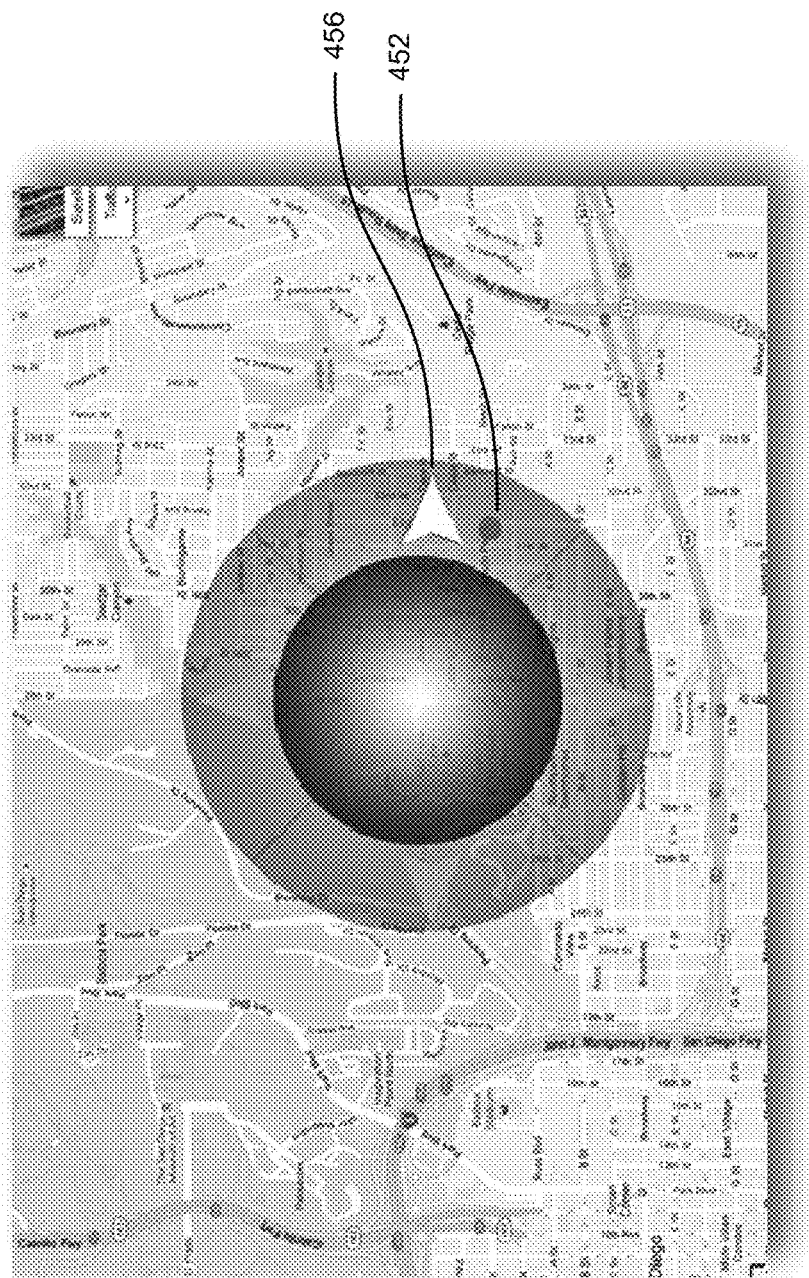

Referring to FIG. 14, a dot 452 indicates an actual detected 3D coordinate. Visual feedback, for example a visual indicator 456 that may change colors, flash, etc. may be provided to show that content displayed on the user device, for example a map, is panning. Also, audio feedback may be provided to indicate a mode/function change.

In real time, the content, e.g., the map, may be panning while a control such as joystick 320 is displayed. In this regard, as long as the object hovers within the right panning sector, the map may continue to pan to the right at a particular speed.

Additionally, content displayed on a user device, e.g., a map, may continue to pan if a detected coordinate identified by a dot 452 is within a panning sector. According to various embodiments, such feature may be configurable behavior.

With respect to pivoting of joystick 320, joystick 320 may be pivoted when the hovering of the object (e.g., finger) is moved to some particular angle, and velocity may be calculated. For example, if a user moves the object (e.g. finger) quickly to the right, then a panning speed may be scaled to the velocity. As illustrated in the example of FIG. 14, if the user moves outside of an outer circle 455, the panning speed may be increased, for example doubled, compared to the panning speed used when staying within the first region just outside of the circle or stable zone. Velocity or speed may be determined and scaled according to how far a detected coordinate is located from a center control. For example, in FIG. 14, a panning speed may be determined and scaled according to how far the detected coordinate or dot 452 is located from the center or initial detected coordinate, i.e., the center of the joystick. While embodiments have been described and illustrated with respect to "joystick" control of a map, those skilled in the art will appreciate that other embodiments may be implemented. For example, other functions besides zoom and pan may be effected based on detecting 3D position of an object after system engagement. Further, the object may be tracked, absolute coordinates of the object may be determined, a virtual force of the object movement may be determined, etc. Further, information and/or images other than a map may be displayed. Further, not only the motion or position of the object may be detected, but the tilt of the object may be detected in some embodiments. In some embodiments, a 3D display is engaged when an object is detected as hovering within a bounding region relative to the display for a predetermined period of time. In such embodiments, subsequently detected motion of orientation of the object may be used to traverse displayed 3D imagery, move elements (for example into folders or other locations), etc.

According to one or more embodiments, a system may be disengaged in various manners. For example, a user may quickly remove his or her hand from a user device. In other cases, disengagement may occur upon detection of a sudden increase in velocity of the user's hand, such as detecting a sudden wave or shake of the user's hand, though not necessarily completely removed from the device. In other cases, disengagement may occur upon detection of the user's hand moving sufficiently far away from the original stable zone initialization, for example, some predetermined threshold distance away, which may not be completely removed from the device. In some cases, disengagement also includes waiting for a predetermined threshold amount of time after the user's hand reaches a threshold distance according to any of these examples. Other examples are possible, and embodiments are not so limited. Thereafter, the system may be disengaged upon a certain occurrence or trigger, including for example: 1) a predetermined amount of time has passed (for example, 2-3 seconds) without any new coordinate updates, b) the system receives a system-mode change, or 3) no object is detected. Further, disengagement may be effected upon detection of a disengagement action, gesture, or command.

Upon the system being disengaged, visual indicators, for example a control such as a joystick, may be removed from a display of the user device and/or an audio indication may be presented to the user.

Advantageously, according to one or more embodiments herein, disengagement of the system may appear immediate to the user and feel natural.

Figure 15:
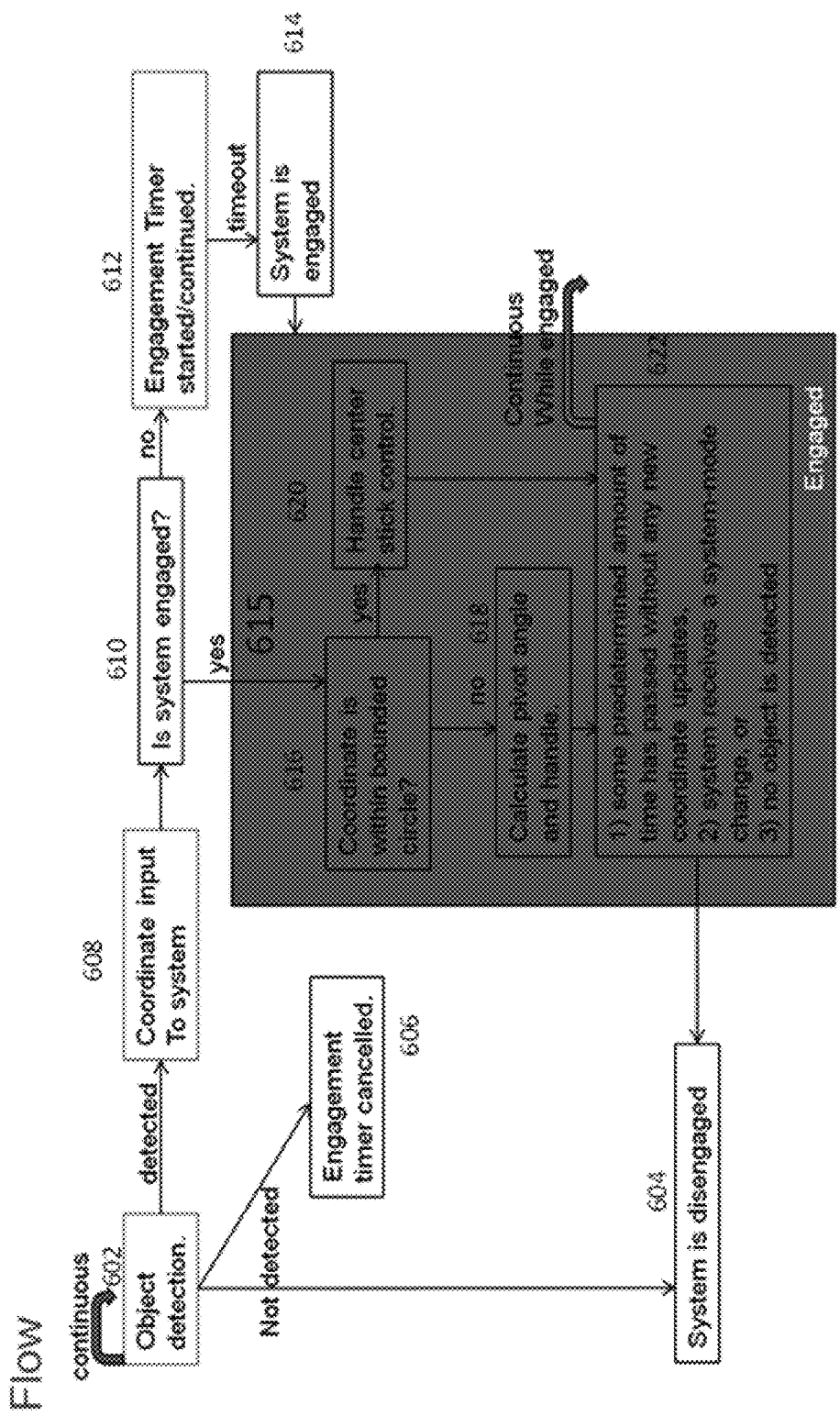
FIG. 15 is a flow diagram illustrating a method for engaging a system via 3D object detection according some embodiments.

Referring now to FIG. 15, a flow diagram illustrates a method for engaging a system via 3D object detection according to an embodiment of the present disclosure.

In block 602, a system may determine if an object is detected, for example, a finger hovering over a user device. The system may be configured to detect objects on a continuous basis.

In block 604, if no object is detected, then the system is disengaged.

In block 606, if no object is detected, for example, if no object is detected hovering (e.g., within coordinates above the system, or off-screen with respect to the system) for a certain amount of time, an engagement timer may be cancelled.

In block 608, if the system determines that an object is detected, the coordinates (e.g., 3D coordinates) of the object may be inputted to the system.

In block 610, it is determined whether the system is engaged. If the system is engaged, the process continues to block 615, wherein the system is engaged.

In block 612, if the system is not engaged, the engagement timer may be started or continued.

In block 614, the system may become engaged before a timeout as measured by the engagement timer. For example, the system is engaged upon an object being detected hovers for a predetermined amount of time. Once the system is engaged, the process continues to block 615.

In block 616, once the system is engaged, the system determines whether the 3D coordinates of the object inputted to the system are within a bounded region such as a bounded circle.

In block 618, if the 3D coordinates of the object are not within the bounded region, then a pivot angle may be calculated and handled.

In block 620, if the 3D coordinates of the object are within the bounded region, then a center control, for example, a center control of a joystick may be handled.

In block 622, the system remains engaged unless an occurrence or a trigger causes the system to disengage, including for example: 1) a predetermined amount of time passes without any coordinate updates, 2) the system receives a system-mode change, or 3) no object is detected.

Figure 16A:
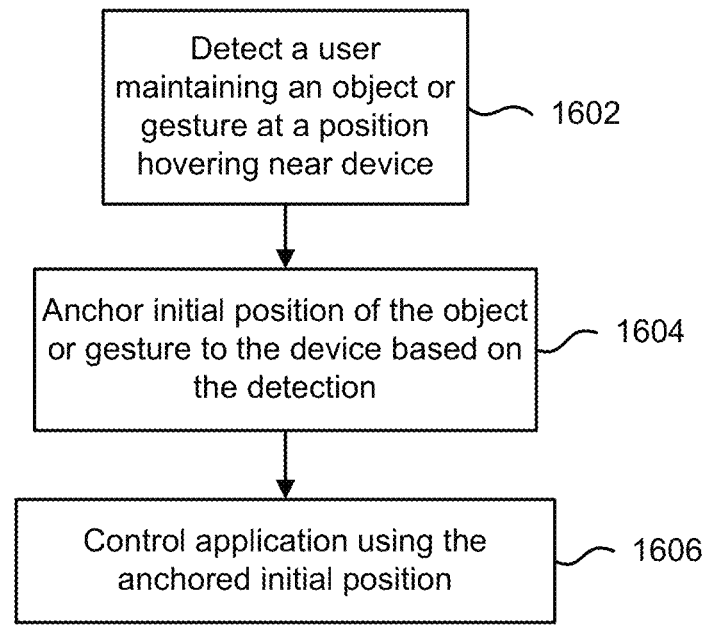
FIGS. 16A-16C are other example flow diagrams illustrating a method for engaging and controlling a system via 3D object detection according to some embodiments.
Figure 16B:
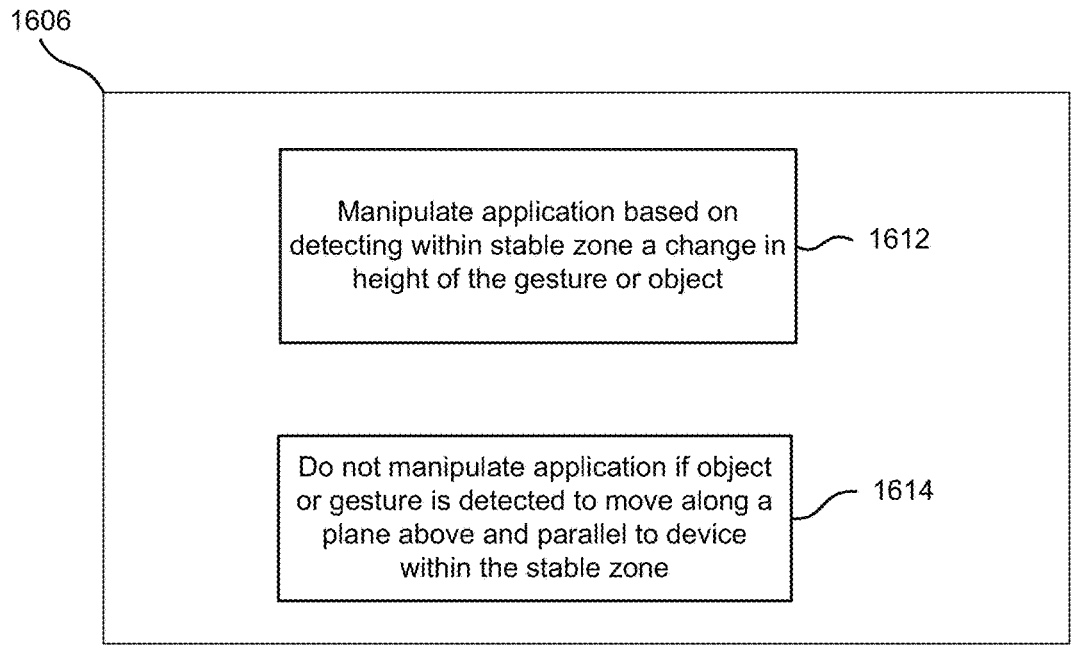
Figure 16C:
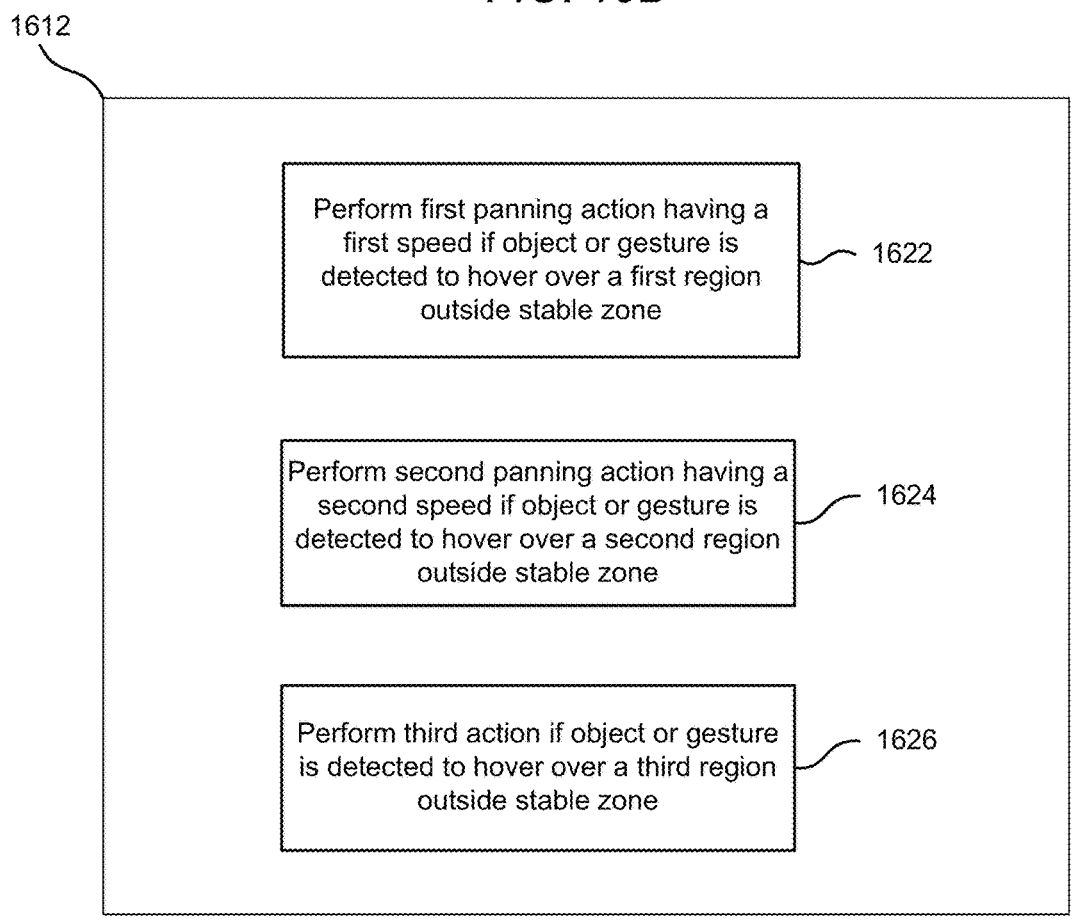

Referring to FIGS. 16A, 16B, and 16C, additional flowcharts are provided consistent with some embodiments. At block 1602 of FIG. 16A, a method for controlling an application may include detecting a user maintaining an object or gesture at a position hovering near a device. The object or gesture may include any of the example objects or gestures discussed in any of the present disclosures, along with any and all other variants consistent known to those with skill in the art. The device may be a mobile device, such as a tablet or mobile phone, but may include more stationary devices, such as a computer monitor, television, digital kiosk, and the like.

At block 1604, the method may include anchoring an initial position of the object or gesture to the device based on the detection found in block 1602. The anchored position may be consistent with any of the descriptions discussed in FIGS. 1-14. For example, the anchored position may include a joystick-like control functionality starting at the initial position of the object or gesture hovering near the device.

At block 1606, the method may include controlling an application operating on or associated with the device, using the anchored initial position. Applications may include any type of program capable of being run on the device. Example applications may include a map application like those discussed in FIGS. 3-14. Controlling the application may include any examples details for controlling an application as described in any of FIGS. 1-15, and other controls readily apparent to those with skill in the art.

Referring to FIG. 16B, example details for controlling the application at block 1606 are described. For example, at block 1612, controlling the application may include manipulating the application based on detecting with the stable zone a change in height of the gesture or object relative to the device. In some embodiments, the height referred to herein may be simply a distance, e.g., horizontal, vertical, diagonal, etc., away, above, behind, below, etc., from the device. As mentioned previously, in some embodiments, a stable zone is generated centered around the anchored initial position. In some embodiments, the stable zone is consistent with the circular region as shown in FIGS. 2 and 5-14. In some embodiments, the manipulation of the application includes performing a zooming in or zooming out action of the application, in response to the change in height.

At block 1614, controlling the application may include intentionally not manipulating the application if the object or gesture is detected to move along a plane above and parallel to the device within the stable zone. That is, the object or gesture may only be moving within the stable zone but not closer to or further away from the device. In some embodiments, not manipulating the application may also include detecting movements closer to or further away from the device within a small region from the anchored initial position. That is, the object or gesture may move only slightly in any 3-dimensional direction and still not manipulate the application.

Referring to FIG. 16C, further example details of manipulating the application at block 1612 are discussed. In some embodiments, at block 1622, manipulating the application may include performing a first panning action having a first speed if the object or gesture is detected to hover over a first region outside the stable zone. An example first region may include the outer circle portion shown in any of FIGS. 5-14. Also, the first region may be subdivided into multiple sub-regions, where hovering over different sub-regions results in a slightly different action, e.g., a panning motion in a different direction but at the same speed as the other actions within the first region.

At block 1624, in some embodiments, manipulating the application may further include performing a second panning action having a second speed if the object or gesture is detected to hover over a second region outside the stable zone. In some embodiments, the second region is farther away from the stable zone than the first region. In some embodiments, the first speed associated with the first panning action is slower than the second speed associated with the second panning action.

At block 1626, in some embodiments, manipulating the application may further include performing a third action if the object or gesture is detected to hover over a third region outside the stable zone. In some embodiments, the third region is farther away from the stable zone than the second region. In some embodiments, the third action may include a panning action having a third speed. In other embodiments, the third action may include other kinds of actions consistent with any actions described in the present disclosures, or other readily discernible to those with skill in the art.

Figure 17:
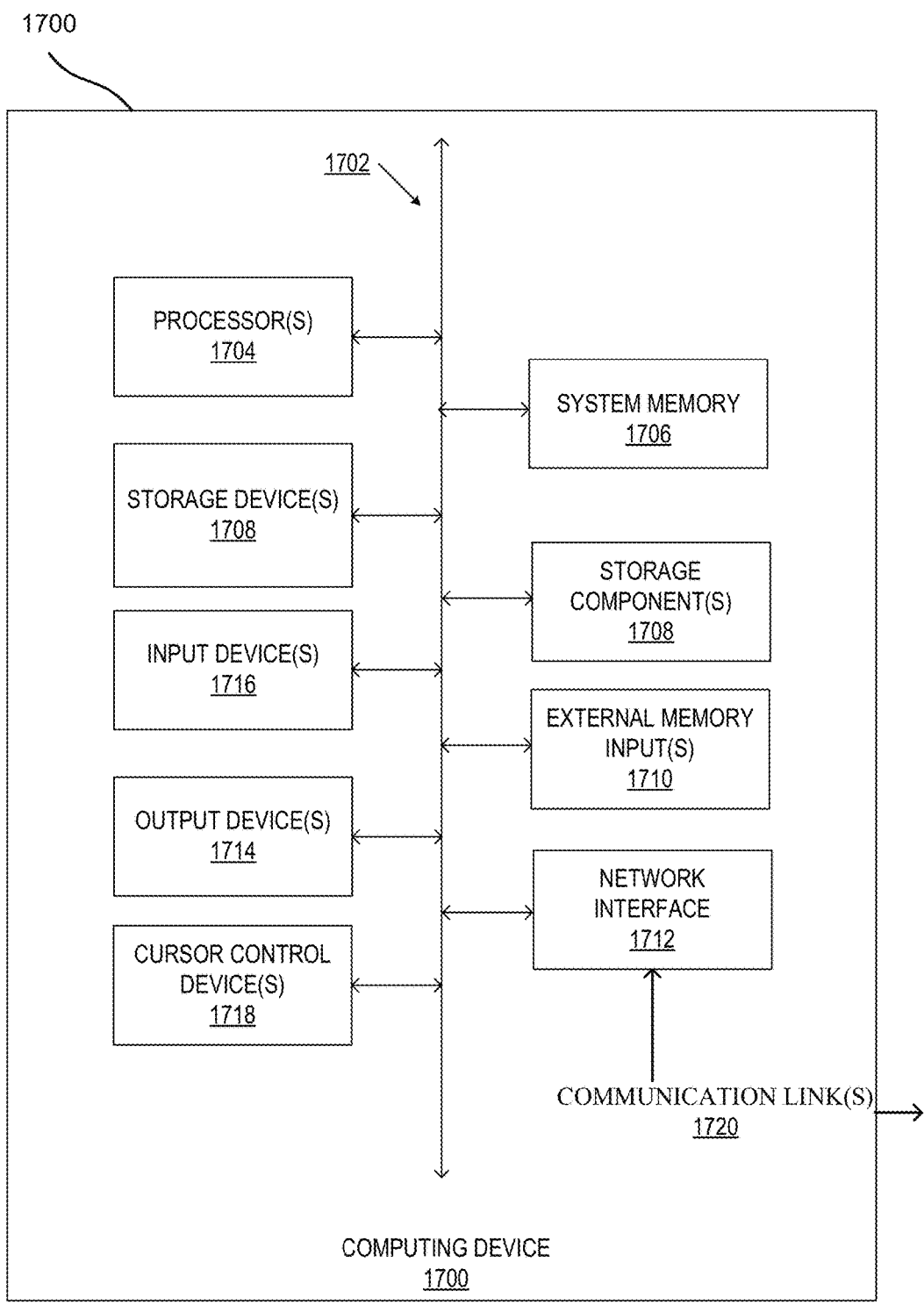
FIG. 17 is a block diagram of a system for implementing a device according to an embodiment of the present disclosure.

Referring now to FIG. 17, a block diagram of a system for implementing a device is illustrated according to an embodiment of the present disclosure. A system 1500 may be used to implement any type of device including wired or wireless devices such as a mobile device, a smart phone, a Personal Digital Assistant (PDA), a tablet, a laptop, a personal computer, a TV, or the like.

System 1700 illustrated in FIG. 17 may be suitable for implementing embodiments of the present disclosure, including devices 102 or 302. System 1700, such as part of a device, e.g., smart phone, tablet, personal computer and/or a network server, may include a bus 1702 or other communication mechanism for communicating information, which interconnects subsystems and components, including one or more of a processing component 1704 (e.g., processor, micro-controller, digital signal processor (DSP), etc.), a system memory component 1706 (e.g., RAM), a static storage component 1708 (e.g., ROM), a network interface component 1712, a display or output component 1714 (or alternatively, an interface to an external display), an input component 1716 (e.g., keypad or keyboard), and/or a cursor control component 1718 (e.g., a mouse pad, joystick). In various embodiments, the input component 1716 may include an object detection component that may include touch-less technologies such as ultrasound technology (e.g., using microphones and/or ultrasonic emitters), image or video capturing technologies such as a camera, IR or UV technology, magnetic field technology, or emitted electromagnetic radiation technology, or the like.

In accordance with embodiments of the present disclosure, system 1700 performs specific operations by processor 1704 executing one or more sequences of one or more instructions contained in system memory component 1706. Such instructions may be read into system memory component 1706 from another computer readable medium, such as static storage component 1708. These may include instructions to engage a system or a device via 3D object detection, and once the system is engaged, switching to a particular mode, function control or interface. In other embodiments, hard-wired circuitry may be used in place of or in combination with software instructions for implementation of one or more embodiments of the disclosure. For example, the processing component 1704, for example in combination with the system memory component 1706, the storage component 1708, the disk drive or external memory component 1710, and/or the network interface component 1712 may be used to implement one or more of blocks 602-622 illustrated in FIG. 15, and/or blocks 1602-1626 in FIGS. 16A-16C, for example based on an object location or position detected by the input component 1716.

Logic may be encoded in a computer readable medium, which may refer to any medium that participates in providing instructions to processor 1704 for execution. Such a medium may take many forms, including but not limited to, non-volatile media, volatile media, and transmission media. In various implementations, volatile media includes dynamic memory, such as system memory component 1706, and transmission media includes coaxial cables, copper wire, and fiber optics, including wires that comprise bus 1702. Memory may be used to store representations of different options for switching a system to a particular mode, function control or interface. In an example, specific object movements may be stored in connection with specific actions such as pulling an object away relative to a device wherein the object is detected hovering over a center region may represent "zooming out," and pushing the detected object down towards the device may represent "zooming in." In some embodiments, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read. The computer readable medium may be non-transitory.

In various embodiments of the disclosure, execution of instruction sequences to practice the disclosure may be performed by system 1700. In various other embodiments, a plurality of systems 1700 coupled by communication link 1720 (e.g., WiFi, or various other wired or wireless networks) may perform instruction sequences to practice the disclosure in coordination with one another. System 1700 may transmit and receive messages, data, information and instructions, including one or more programs (i.e., application code) through communication link 1720 and communication interface 1712. Received program code may be executed by processor 1704 as received and/or stored in disk drive or external memory component 1710 or some other non-volatile storage component for execution.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for controlling an application on a device, the method comprising:
    detecting that a user is maintaining an object at a position hovering, for a threshold length of time, within a threshold distance of the device;
    anchoring an initial position of the object to the device based on the detection of the maintained position;
    in response to the detecting, engaging the device including displaying a user interface indicating one or more commands associated with a change of the object from the anchored initial position; and
    controlling the application using the anchored initial position, the controlling including determining that a detected change of the object from the anchored initial position corresponds to a command of the one or more commands, wherein controlling the application using the anchored initial position comprises detecting three-dimensional movement of the object through space, wherein the space is defined by three dimensional coordinates and wherein the three-dimensional movement comprises movement in the three dimensional coordinates, and wherein the application is manipulated between a plurality of states, each of the plurality of states corresponding to a respective one of several distances between the object and the device.

2. The method of claim 1, wherein controlling the application using the anchored initial position further comprises manipulating the application whenever the object is detected to be outside of a stable zone, the stable zone including the anchored initial position,
    wherein manipulating the application comprises:
        performing a first panning action having a first speed if the object is detected to be within a first region outside of the stable zone; and
        performing a second panning action having a second speed if the object is detected to be within a second region outside of the stable zone, wherein the second region is farther away from the stable zone than the first region.

3. The method of claim 2, wherein manipulating the application is based on the position of the object hovering over the device relative to the initial position.

4. The method of claim 2, wherein manipulating the application further comprises:
    performing a third action if the object is detected within a third region outside of the stable zone, wherein the third region is farther away from the stable zone than the second region.

5. The method of claim 2, wherein the application is not manipulated due to the object, while in the stable zone, moving substantially parallel to a surface of the device over which the object hovered to anchor the initial position of the device.

6. The method of claim 2, wherein the application is manipulated between three states, each of the three states corresponding to a respective one of three distances between the object and the device.

7. The method of claim 1, wherein the user interface indicates the anchored initial position relative to a display used to display the user interface.

8. The method of claim 7, wherein the user interface is centered on the display relative to the initial position of the detected object.

9. The method of claim 1, wherein the controlling the application includes:
    in response to determining that the object moves substantially parallel to a surface of the device over which the object hovered to anchor the initial position of the device, performing a first command of the one or more commands; and
    in response to determining that the object moves substantially perpendicular to the surface of the device, performing a second command of the one or more commands.

10. The method of claim 9, wherein the controlling the application includes performing the first command simultaneously with the second command.

11. The method of claim 9, wherein first command is a command to perform a zoom in or a zoom out action on an image displayed by the device.

12. The method of claim 11, wherein the second command is a command to perform a panning action on the image displayed by the device.

13. The method of claim 12, wherein the panning action includes panning the image in a direction corresponding to the a direction that the object moved substantially parallel to the surface from the anchored initial position.

14. The method of claim 1, wherein the controlling the application using the anchored initial position comprises:
    detecting a change of the object from the anchored initial position without detecting contact between the object and the device.

15. The method of claim 1, wherein the detecting three-dimensional movement of the object through space comprises:
    detecting that the object moves in each of three dimensions of the space.

16. An apparatus comprising:
    at least one sensor configured to detect that a user is maintaining an object at a position hovering, for a threshold length of time, within a threshold distance of the apparatus; and
    a processor configured to:
        anchor an initial position of the object to the apparatus based on detection of the maintained position;
        detect, using the at least one sensor, that a user has maintained the object at the position for the threshold length of time and, in response, engage the apparatus including display of a user interface indicating one or more commands associated with a change of the object from the anchored initial position; and
        control an application configured to operate on the apparatus using the anchored initial position, the control including determining that a detected change of the object from the anchored initial position corresponds to a command of the one or more commands, wherein controlling the application using the anchored initial position comprises detecting three-dimensional movement of the object through space, wherein the space is defined by three dimensional coordinates and wherein the three-dimensional movement comprises movement in the three dimensional coordinates, and wherein the application is manipulated between a plurality of states, each of the plurality of states corresponding to a respective one of several distances between the object and the apparatus.

17. The apparatus of claim 16, wherein the processor is further configured to:
    manipulate the application whenever the object is detected to be outside of a stable zone, the stable zone including the anchored initial position;

perform, in the application, a first panning action having a first speed if the object is detected to be within a first region outside of the stable zone; and perform, in the application, a second panning action having a second speed if the object is detected to be within a second region outside of the stable zone, wherein the second region is farther away from the stable zone than the first region.

18. The apparatus of claim 17, wherein manipulating the application is based on the position of the object hovering over the apparatus relative to the initial position.

19. The apparatus of claim 17, wherein the processor is further configured to:

perform, in the application, a third action if the object is detected within a third region outside of the stable zone, wherein the third region is farther away from the stable zone than the second region.

20. The apparatus of claim 17, wherein the application is not manipulated due to the object, while in the stable zone, moving substantially parallel to a surface of the apparatus over which the object hovered to anchor the initial position of the apparatus.

21. The apparatus of claim 17, wherein the application is manipulated between three states, each of the three states corresponding to a respective one of three distances between the object and the apparatus.

22. The apparatus of claim 16, wherein the displaying the user interface includes indicating the anchored initial position relative to a display used to display the user interface.

23. The apparatus of claim 22, wherein the user interface is centered on the display relative to the initial position of the detected object.

24. An apparatus comprising:

means for detecting that a user is maintaining an object at a position hovering, for a threshold length of time, within a threshold distance of the apparatus;

means for anchoring an initial position of the object to the apparatus based on the detection of the maintained position;

means for engaging the device in response to detecting that a user maintained an object at a position hovering within predefined coordinates above the apparatus for a threshold length of time, including display of a user interface indicating one or more commands associated with a change of the object from the anchored initial position; and means for controlling an application operating on the apparatus using the anchored initial position, the means for controlling including determining that a detected change of the object from the anchored initial position corresponds to a command of the one or more commands, wherein controlling the application using the anchored initial position comprises detecting three-dimensional movement of the object through space wherein the space is defined by three dimensional coordinates and, wherein the three-dimensional movement comprises movement in the three dimensional coordinates, and wherein the application is manipulated between a plurality of states, each of the plurality of states corresponding to a respective one of several distances between the object and the apparatus.

25. The apparatus of claim 24, wherein the means for controlling the application using the anchored initial position further comprises means for manipulating the application whenever the object is detected to be outside of a stable zone, the stable zone including the anchored initial position, wherein the means for manipulating the application comprises:

means for performing a first panning action having a first speed if the object is detected to be within a first region outside of the stable zone; and means for performing a second panning action having a second speed if the object is detected to be within a second region outside of the stable zone, wherein the second region is farther away from the stable zone than the first region.

26. The apparatus of claim 25, wherein the means for manipulating the application is based on the position of the object hovering over the apparatus relative to the initial position.

27. The apparatus of claim 25, wherein the means for manipulating the application further comprises:

means for performing a third action if the object is detected within a third region outside of the stable zone, wherein the third region is farther away from the stable zone than the second region.

28. The apparatus of claim 25, wherein the application is manipulated between three states, each of the three states corresponding to a respective one of three distances between the object and the apparatus.

29. The apparatus of claim 24, wherein the means for controlling the application comprises means for using a user interface anchored to the application based on the anchored initial position relative to a display used to display the user interface.

30. The apparatus of claim 29, wherein the user interface is centered on the display relative to the initial position of the detected object.

31. A non-transitory processor-readable medium comprising processor-readable instructions that, when executed by one or more processors, cause the one or more processors to:

detect that a user is maintaining an object at a position hovering within predefined coordinates, for a threshold length of time, within a threshold distance of a device;

anchor an initial position of the object to the device based on detection of the maintained position;

in response to the detection, engage the device including display of a user interface indicating one or more commands associated with a change of the object from the anchored initial position; and control an application configured to operate on the device using the anchored initial position, the control including determining that a detected change of the object from the anchored initial position corresponds to a command of the one or more commands, wherein controlling the application using the anchored initial position comprises detecting three-dimensional movement of the object through space near the device, wherein the space is defined by three dimensional coordinates and wherein the three-dimensional movement comprises movement in the three dimensional coordinates, and wherein the application is manipulated between a plurality of states, each of the plurality of states corresponding to a respective one of several distances between the object and the device.

32. The non-transitory processor-readable medium of claim 31, wherein the instructions, when executed by the one or more processors, further cause the one or more processors to:

manipulate the application whenever the object is detected to be outside of a stable zone, the stable zone including the anchored initial position;

perform, in the application, a first panning action having a first speed if the object is detected to be within a first region outside of the stable zone; and perform, in the application, a second panning action having a second speed if the object is detected to be within a second region outside of the stable zone, wherein the second region is farther away from the stable zone than the first region.

33. The non-transitory processor-readable medium of claim 32, wherein the application is not manipulated due to the object, while in the stable zone, moving substantially parallel to a surface of the device over which the object hovered to anchor the initial position of the device.

34. The non-transitory processor-readable medium of claim 32, wherein the application is manipulated between three states, each of the three states corresponding to a respective one of three distances between the object and the device.

\* \* \* \* \*